(12) United States Patent
Reneker et al.

(10) Patent No.: US 7,496,241 B1
(45) Date of Patent: Feb. 24, 2009

(54) PRECISION OPTICAL SYSTEMS WITH PERFORMANCE CHARACTERIZATION AND USES THEREOF

(75) Inventors: Douglas Alan Reneker, Naperville, IL (US); Christopher Cotton, Mendon, NY (US); Damon W. Diehl, Rochester, NY (US)

(73) Assignee: Goodrich Corporation, Charlotte, NC (US)

( * ) Notice: Subject to any disclaimer, the term of this patent is extended or adjusted under 35 U.S.C. 154(b) by 729 days.

(21) Appl. No.: 11/222,562

(22) Filed: Sep. 8, 2005

(51) Int. Cl.
*G06K 9/40* (2006.01)

(52) U.S. Cl. .................. 382/275; 382/260; 382/274

(58) Field of Classification Search ............ 382/260, 382/274, 275
See application file for complete search history.

(56) References Cited

U.S. PATENT DOCUMENTS

| | | | |
|---|---|---|---|
| 5,155,597 A | 10/1992 | Lareau et al. | 348/311 |
| 5,668,593 A | 9/1997 | Lareau et al. | 348/146 |
| 5,694,479 A * | 12/1997 | Guering et al. | 382/141 |
| 6,163,381 A * | 12/2000 | Davies et al. | 356/521 |
| 6,208,412 B1 * | 3/2001 | Ladewski | 356/239.1 |
| 6,694,094 B2 | 2/2004 | Partynski et al. | 396/7 |
| 6,826,358 B2 | 11/2004 | Partynski et al. | 396/7 |
| 6,831,688 B2 | 12/2004 | Lareau et al. | 348/272 |
| 7,038,791 B2 * | 5/2006 | Smith | 356/520 |
| 7,365,838 B2 * | 4/2008 | Jones | 356/239.1 |

* cited by examiner

*Primary Examiner*—Yosef Kassa
(74) *Attorney, Agent, or Firm*—McDonnell Boehnen Hulbert & Berghoff LLP

(57) ABSTRACT

An optical system includes a reference projector that projects collimated beams of light into the optical system entrance aperture which are imaged by an image recording device. The beams produce fiducial images present in every image captured by the imaging recording device. The fiducial images can be used to characterize the performance of the optical system and derive distortion correction coefficients. The distortion correction coefficients can be applied to a portion of an image, such as a group of pixels, or to the entire image, to thereby compensate for distortions in the optical system. In some embodiments, e.g., airborne cameras, the projector is rigidly coupled to an inertial measurement unit. The ability of the airborne camera to perform object geolocation from imagery is improved. The fiducial images enable optical system performance to be characterized and distortion correction coefficients to be obtained and thereby improve the accuracy of a ray angle calculation to the object of interest. Furthermore, the ray angle can be related to an inertial measurement system coordinate system using a direction cosine matrix.

33 Claims, 21 Drawing Sheets

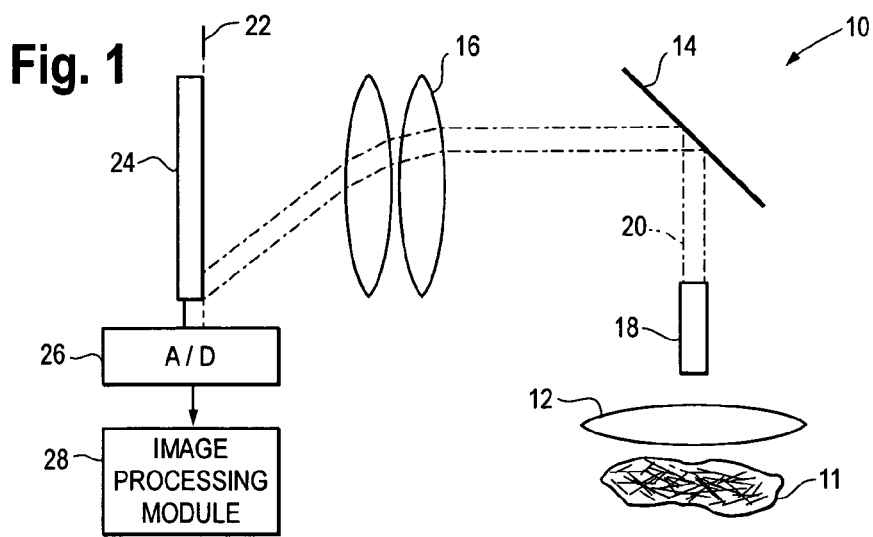
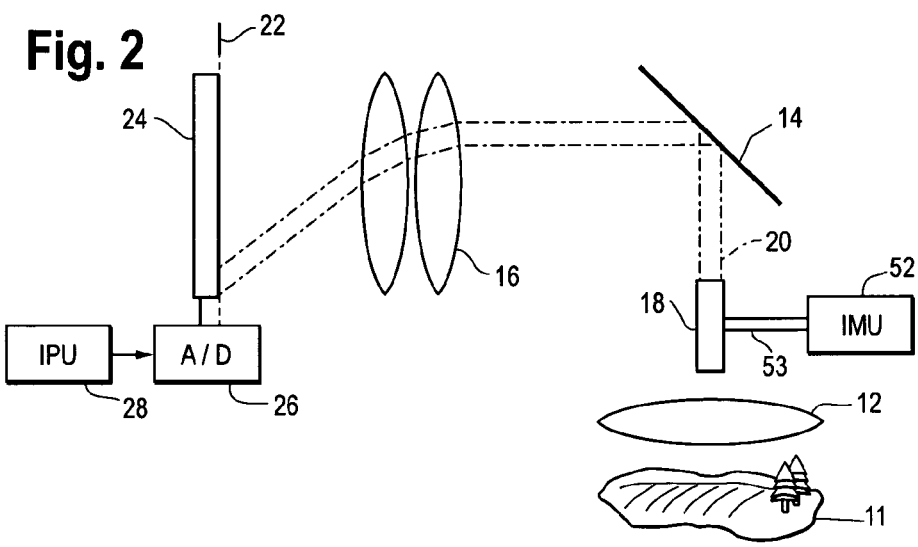
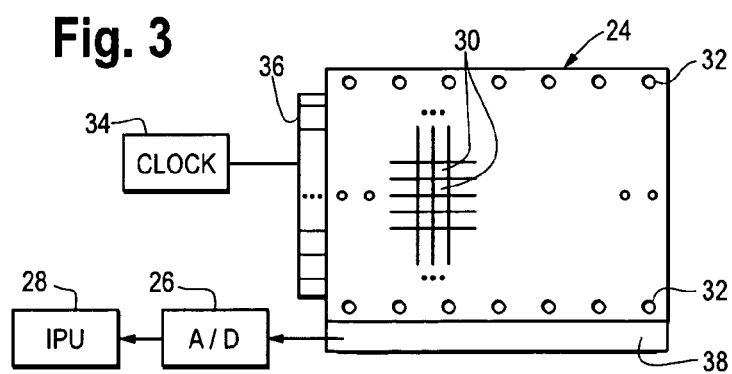

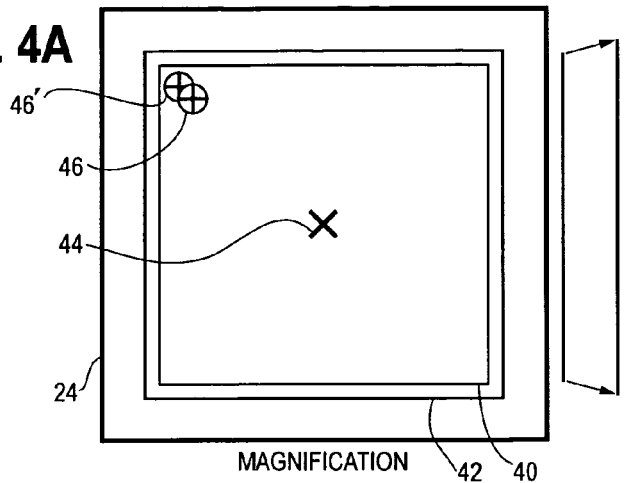
Fig. 4A MAGNIFICATION
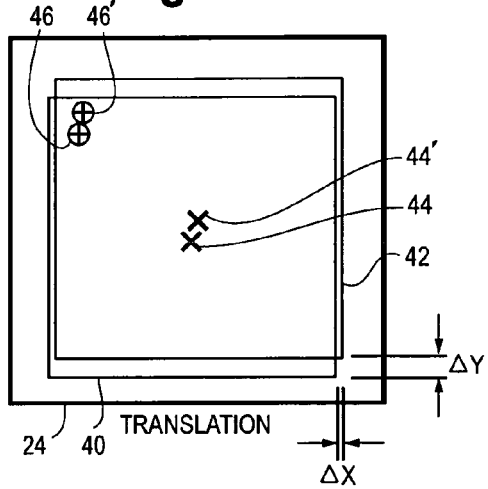
Fig. 4B TRANSLATION
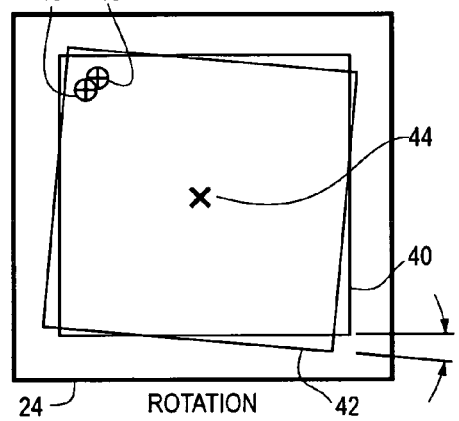
Fig. 4C ROTATION
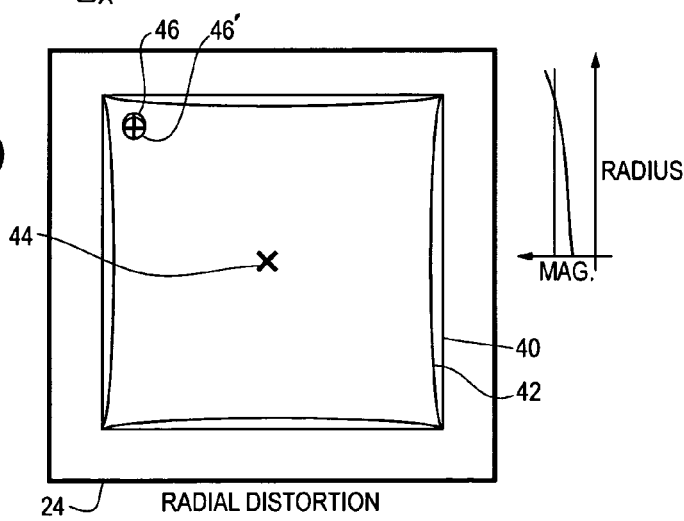
Fig. 4D RADIAL DISTORTION

TOTAL IMAGE DISTORTION

FOCAL PLANE ARRAY

MULTI-BEAM COLLIMATOR

SCENE CLUTTER

GHOSTS

$$\{x_C, y_C\} = \frac{\Sigma_{PIXELS} I(x,y)\{x,y\}}{\Sigma_{PIXELS} I(x,y)}$$

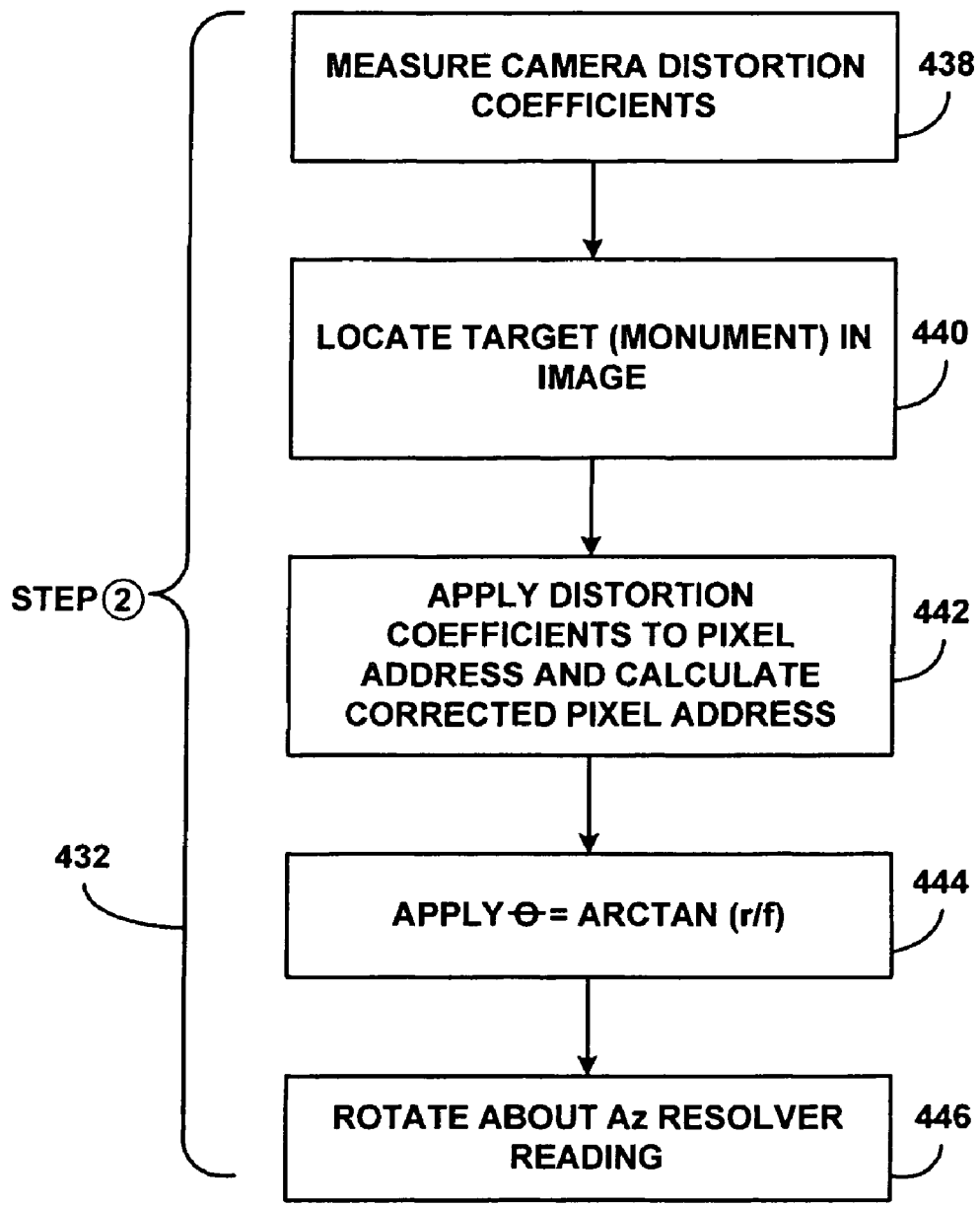

PRECISION OPTICAL SYSTEMS WITH PERFORMANCE CHARACTERIZATION AND USES THEREOF

STATEMENT REGARDING FEDERALLY SPONSORED RESEARCH OR DEVELOPMENT

This invention was made with Government support under contract no. N0017304C2002 awarded by the Naval Research Laboratory. The Government has certain rights in this invention.

BACKGROUND OF THE INVENTION

A. Field of the Invention

This invention relates generally to the subject of precision optical imaging systems such as found in telescopes, aerial reconnaissance and surveillance cameras, advanced weapons, microscopes and other high performance applications, and more particularly to a methods and apparatus for characterizing the performance of such an optical system, and improved optical systems including such characterization apparatus. Characterization of the performance of an optical system has several applications. One such application, in the reconnaissance scenario, is increased accuracy of geolocation of targets in an image taken by the camera on the surface of the earth. Other applications include passive weapon aiming, passive determination of range from the imaging system to a target, improved mapping of the earth, and vehicle navigation from imagery of known objects.

B. Description of Related Art

Aspects of this invention have resulted from the present inventors' labors to improve the ability of an aerial reconnaissance camera system to geolocate targets in an image taken from the camera. Reconnaissance cameras are known in the art and described in the patent literature, see for example U.S. Pat. Nos. 5,155,597, 5,668,593 and 6,694,094, all assigned to the assignee of this invention.

Today's modern reconnaissance cameras typically use solid state image detector arrays made of semiconductor materials and composed of individual pixel elements arranged in a rectangular format of rows and columns. This disclosure takes advantage of the concept that a camera, at an elemental level, can be viewed as a device that translates incoming ray angles to positions, where the positions in the image have pixel addresses, on a focal plane array. In particular, when a target on the ground is imaged by an aerial reconnaissance camera, a ray in three-dimensional space extending from the camera to the target can be calculated, given the camera's position and orientation at the time of the exposure. The intersection of this ray on the focal plane array is, in theory, at a single point on the array for a suitably small target. The point where the ray intersects the array can be identified as a pixel with a given row and column address. With this information known, as well as the camera's position in space and its orientation at the time of the exposure of the array, it is possible using known algorithms to estimate the location of the target corresponding to this pixel address on the surface of the earth. The camera's position in space is typically obtained from an inertial measurement unit, that maybe associated with a Global Positioning System (GPS) unit included in a camera electronics package or from a similar navigation system present aboard the aircraft.

Object geolocation from imagery has uses in a variety of fields, including mapping, and in military applications, including surveillance and locating potential targets for precision guided munitions.

There are several complicating factors that must be addressed to reach desired levels of geolocation accuracy with current operational reconnaissance cameras. These complicating factors have not been satisfactorily addressed in the known prior art. Two primary factors are as follows:

1) Optical distortion of the camera exists, and changes with time, in ways that are not easily predicted. For example, a camera may have many mirrors and or lenses in its optical path, and a focusing element, all of which can introduce significant distortion. Such distortions are influenced by temperature, pressure, humidity, and also by mechanical factors in the camera's design and construction, including the effects of vibration component misalignment, and the expansion or contraction of materials. Other changes may be deliberate, such as adjustment or other optical compensation.

2) All cameras have a line of sight that represents the direction that the camera is imaging. The line of sight is typically the center of the field of view of a camera. The direction of that line of sight may be governed by the orientation of the camera, the orientation of a gimbaled portion of the camera, a pointing mirror, or other means. Some cameras have structures that maintain a fixed relationship to the line of sight, while others do not. The structure may be too small to support an inertial measurement unit. Therefore a means for measuring the position of this line of sight or for determining the effect of some gimbal, mirror, or other optical elements on the camera field of view is required. Furthermore, geolocation requires periodic measurement of camera orientation during operation (i.e., measurement as every image is captured), and the camera line of sight or field of view needs to be related to geographic coordinates. Data as to both camera position & camera attitude are required.

The methods and apparatus disclosed herein address both of these problems. The solutions disclosed herein are also applicable to optical systems generally.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments one or more of the above-described problems have been reduced or eliminated, while other embodiments are directed to other improvements.

Aspects of this disclosure provide for methods for characterizing the performance of the optical system in real time during the generation of imagery. Such characterization can lead to a set of data (e.g., transformation coefficients or relationships, as explained below) which can be used to compensate for optical distortion in the optical system. Obtaining this characterization data, and using it to compensate for pointing and optical distortions that are characteristic of the camera at the moment the targets of interest are imaged, results in an increased accuracy in determining the ray angle to the target on the ground, and therefore results in an improved ability to perform object geolocation from imagery. The methods also have other uses beside object geolocation from imagery; indeed the determination of distortion and ability to correct for such distortion has usefulness generally in high precision optical systems. For example, the distortion correction process can be applied to the entire image to generate a new image that removes the distortion. The methods can be used for example in telescopes, microscopes, or other types of precision optical systems, including optical targeting systems for precision guided munitions.

In a first aspect, a precision optical system is described that includes an optical system for forming light from a scene into an image at a focal plane. An image recording device is located at the focal plane and produces an output that measures light intensity of the scene as a function of position. The optical system further includes an optical projector that projects a set of collimated beams of light into the optical system aperture which are imaged by the image recording device. By virtue of this design, reference points, referred to herein as "fiducial images" from the projector, are available in every image, under all operating conditions. Each collimated beam from the projector forms a fiducial image on the image recording device. These images are captured during the same exposure interval as the target scene is imaged. The present disclosure further relates to the design of the projector and the uses thereof in generating optical system characterization data. From such data, correction coefficients to compensate for optical distortion, misalignment, focus errors, and other sources of imperfection in the optical system can be derived and used to compensate for such errors.

The image recording device is preferably, but not necessarily, an electro-optical image recording device constructed as an array of pixel elements, such as a charge coupled device (CCD), complimentary metal oxide semiconductor (CMOS) detector, or other similar device. The construction and arrangement of the image recording device is not particularly important. The optical system further includes a processing module including software for applying a distortion correction to at least a portion of the image, the distortion correction using or based on the fiducial images from the projector.

In preferred embodiments, the distortion correction software determines the location of the centers of the fiducial images from the projector in the captured images, and compares such locations to the locations where such fiducial images would have been imaged if the system were aberration and distortion free. Distortion coefficients are then determined which map the actual location to the theoretical locations. The distortion coefficients may perform translation, rotation or other transformations to the image, and such transformations can be applied in series to the image or portion thereof. For example, the application of the distortion coefficients to a pixel location of an object of interest results in a new, corrected pixel location and from such corrected pixel location a more accurate calculation of ray angle to the scene target can be made. In alternative embodiments, the correction process could be applied to the entire image to generate a new corrected (undistorted) image. Examples are described below of various distortion correction processes, including 1) an inverse polynomial transformation correction modeling magnification and distortion errors of the optical system, 2) a rotation transformation correction, and 3) a linear transformation correction. Other corrections could be performed, including a "keystone" correction, "anamorphic distortion" correction, or others.

Note further that the reference projector is preferably built into the precision optical system such that the projector projects the beams onto the image recording device at the time of each exposure of the image recording device. Therefore, the process of obtaining distortion correction coefficients can be performed in each image. Moreover, dynamic variation in optical system parameters which cause distortion errors, such as due to changes in temperature, pressure, misalignment due to vibration, can be compensated for automatically in every image.

In a second aspect, a method is disclosed for compensating for distortion errors in a precision optical system. The method includes the steps of:

a) determining the location on an image recording device where collimated beams from a projector would be imaged by the image recording device incorporated into the precision optical system if the optical system were distortion free;

b) obtaining an image of a scene along with the image of the collimated beams projected onto the image recording device by the projector and determining the location of the collimated beams in the image;

c) determining transformation coefficients that map the locations of the image of the collimated beams on the image recording device from the image of step b) to the locations determined in step a); and d) applying the transformation coefficients to at least a portion of the image of the scene in step b) such that the optical system distortions are corrected.

The above method determines transformation coefficients from pixel locations of fiducial images in a pixel location space or domain. In alternative embodiments, such information is obtained from a ray angle space. In a yet further aspect, a method for compensating for distortion errors in a precision optical system is disclosed, comprising the steps of:

a) obtaining an image of a scene along with an image of collimated beams of light projected onto an image recording device by a projector;

b) determining the locations on the image recording device of the collimated beams in the image and the associated true ray angles for the collimated beams;

c) determining the apparent incoming ray angles θ of the collimated beams from the locations on the image recording device (i.e., the ray angles that would occur if the optical system were distortion free) using the relation θ=arctan (r/f), where r is a scalar distance from the location of the beams to the center of the image recording device and f is the focal length of the optical system;

d) determining transformation coefficients that map the true incoming ray angles determined in step b) to the apparent incoming ray angles determined in step c); and e) applying the transformation coefficients determined in step d) to at least a portion of the image to thereby correct optical system distortions.

In one possible embodiment, the precision optical system is an airborne camera such as an aerial reconnaissance, mapping, or surveillance type camera. The transformation coefficients are applied to pixel coordinates for pixels imaging an object of interest in a scene to thereby obtain corrected pixel coordinates for the object. The corrected pixel coordinates can be supplied to a processing module applying a geolocation algorithm for determining the location of the object on the surface of the earth. In such embodiment, to obtain the relationship between pixel coordinates and location on the earth, there needs to be known a geometrical relationship between the fiducial images from the projector and an external coordinate system that can be related to earth coordinates. To provide this feature, the projector is preferably rigidly coupled to an inertial measurement unit. Both the projector and the inertial measurement unit are preferably mounted within the aerial camera. By virtue of this rigid coupling arrangement, a geometrical relationship can be derived relating angles from the target of interest in the image to a reference axis in the coordinate space of the reference projector to angles in the coordinate space in the inertial measurement unit. The relationship between the coordinate space of the inertial measurement unit and coordinate space on the earth can be obtained by imaging targets or monuments whose location has been precisely determined, e.g., by a terrestrial survey. With all this information in hand, it is possible to relate the ray angle in the projector coordinate space to earth coordinates and thereby obtain a geographic location on the earth of a target imaged by the image recording device.

This method is based, in part, on the concept that if each image contained reference points, that are referenced to geographic coordinates, then both the optical system pointing information (i.e., ray position to target in three dimensional space) and the camera distortion can both be deduced. Suitable reference points could be stars (at night), or surveyed monuments on the ground. However, for operational flexibility, these sources are not sufficiently available, e.g., daytime operation of a camera or operation in an unmapped or poorly mapped area. In this embodiment, a significant inventive aspect is that the optical system includes the reference projector which is installed directly into the camera which provides desired geographic reference information in every image, overcoming this additional problem. Moreover, the same reference projector can be used to characterize the optical system performance and provide data from which distortion errors can be corrected.

As described in detail below, the location of the beams from the reference projector can be related to coordinates in an inertial measurement unit that is included in the camera and therefore the angles for an object of interest in the image to the projected images can be related to the inertial measurement coordinate system, which can then be used for improved geolocation of the objects of interest.

Thus, in a further aspect, an aerial reconnaissance embodiment is disclosed that includes features for improved geolocation of targets in imagery captured by the optical system. In particular, the projector has a coordinate system for describing the angles of various beams that exit the projector, and a process is described below for converting pixel locations for the beams in an image to angles in this coordinate system. The optical system further includes an inertial measurement unit (IMU) that likewise includes a reference coordinate system for describing its position and orientation in space. The IMU has the ability to measure both its position and its orientation in space. The projector is rigidly, mechanically coupled to the IMU, and thus a fixed relationship is established between the coordinate systems of the IMU and the projector.

This relationship between projector and IMU can be expressed mathematically as a direction cosine matrix. This matrix allows an angle, expressed as a vector in one coordinate space (the projector coordinate space), to be transformed to the other coordinate space (the IMU coordinate space). Thus, for a camera in accordance with this construction, one can calculate the angle to the unknown target in the projector coordinate space, multiply this angle by the direction cosine matrix that transforms from the projector to IMU coordinates, and the result is the angle to the target in the IMU coordinate space. This angle is useful for determining the location of the target on the surface of the earth.

The direction cosine matrix can be ascertained by what is referred to herein as a boresighting process. The first step in the boresighting process is to capture an image that contains monuments (or targets) on the ground whose positions have been determined with suitable accuracy. The term "surveyed" means that the position is known in the position coordinate system of the IMU. This position coordinate system could be expressed, for example, in a spherical coordinate system, such as latitude, longitude and elevation above sea level, as in the case of a GPS satellite navigation system. Because the IMU measures the location of the camera when the image of the monuments is captured, and the monument positions are known, the angle between the IMU and the monuments on the ground is also known, in the angular coordinate space of the IMU.

The second step is to determine the angle to the monuments in the projector coordinate space. This can be done by capturing the image of the monuments, measuring camera distortion, compensating for the distortion, and converting the pixel positions of the monument in the image to a ray angle in the projector coordinate space.

Now, for the camera imaging the surveyed monument(s), we have the same two rays, one described in the IMU position coordinate space, and one described in the projector coordinate space. A direction cosine matrix that transforms from the projector to the IMU space can now be calculated directly. Thereafter, for any image of the earth generated by the camera, the direction cosine matrix can be used to translate from the angle to the object of interest from the projector coordinate system to the IMU positional coordinate system and therefore the position of the object on the ground in the IMU positional coordinate system can be determined.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 1 is an illustration of an optical system having a reference projector projecting collimated beams of light onto an image recording device. The imaging recording device records the images of the beams (fiducial images) as well as the scene. The location of where the fiducial images are imaged on the image recording device, e.g., pixel addresses, is determined by an image processing module. This module further derives distortion correction coefficients from the location of fiducial images which can be applied to the image or a portion thereof.

FIG. 2 is an illustration of an alternative embodiment in which the reference projector is rigidly coupled to an inertial measurement unit incorporated into the optical system. The embodiment of FIG. 2 might be used in a situation where the optical system comprises an aerial reconnaissance or surveillance camera, whereas the embodiment of FIG. 1 might be used in a microscope, telescope, aerial camera, or other application where inertial information is not necessary to the performance requirements or functionality of the optical system.

FIG. 3 is an illustration of the image recording device of FIG. 1 or FIG. 2 in the form of an electro-optical imager arranged as a plurality of pixels arranged in rows and columns.

FIGS. 4A-4D show examples of magnification, translation, rotation and radial distortion errors, respectively, which may be observed in an image generated by the optical system of FIGS. 1 and 2, due to, for example, misalignment errors, imperfection in the optical system components, thermal expansion or contraction of materials, pressure changes, or other factors.

FIG. 25B shows step (2) of FIG. 25A in more detail.

FIG. 27 also includes the parameter φ, which is the rotation angle in a 2 dimensional polar coordinate system that identifies the angular position of the target pixel in the coordinate system for a given value of r, with φ determined from the pixel address.

DETAILED DESCRIPTION

A. Introduction and Overview

Figure 4E:
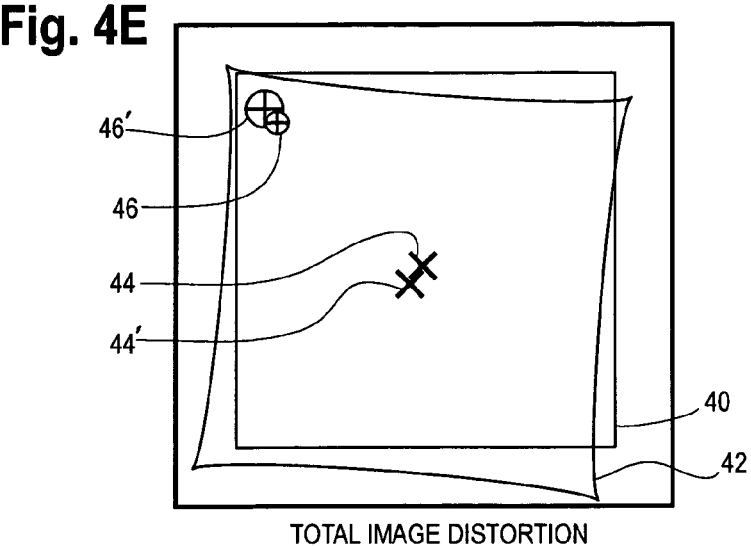
FIG. 4E shows an illustration of a total image disturbance resulting as a sum of the distortion errors of FIGS. 4A-4D.

An aerial reconnaissance camera will be described in detail below that includes features for both characterization of optical system performance and compensation for errors such as distortion in the optical system, and for providing improved methods for geolocation of objects of interest from imagery. It will be appreciated that the features for characterization of optical system performance and compensation for distortion errors can occur independently of the feature of geolocation of objects of interest. The feature of improved geolocation of objects of interest is directed to an embodiment in which an inertial measurement unit (IMU) is incorporated into the camera housing and coupled to a reference projector. Usage of an inertial measurement unit would not be necessary in an aerial reconnaissance or surveillance camera which does not perform geolocation. In such embodiment, the camera includes features for characterization of optical system performance and compensation for distortion errors, which is highly valuable in and of itself. Usage of an inertial measurement unit would not be necessary or in other embodiments where characterization of optical system performance and development of compensation coefficients were all that were desired, such as in a telescope or microscope embodiment.

FIG. 1 is an illustration of a high performance optical imaging system 10, which may take the form of a camera (e.g., reconnaissance camera), telescope, microscope, an optical targeting system for a weapon such as a precision guided munition, or other type of system. The imaging system captures an image of a scene or subject 11, which could be any subject matter. The optical system may include various optical components, the details of which are not important, such as an objective lens 12, a mirror 14, relay or focus optics 16, and possibly other components such as filters, beam splitters, additional mirrors, lenses, a shutter, etc.

The system 10 further includes a reference projector 18 projecting collimated beams of light into the entrance aperture of the optical system. The beams are imaged onto an image recording device 24 positioned at a focal plane 22. The collimated beams are shown in dashed lines 20. The imaging recording device 24 records the images of the beams 20 as well as the scene or subject matter 11 imaged by the optical system components 12, 14, 16. The image of the collimated beams 20 produced by the imaging device can take several forms, one of which are small circular spots. The image of the collimated beams are referred to herein as "fiducial images," and their usage for optical system characterization is described at length below.

The image recording device 24 is preferably an electronic (electro-optical) imaging device such as a CCD imager, CMOS imager, photodiode imager, multi-spectral or hyper-spectral imager, or variant thereof either now known or later developed, that includes a plurality of pixel elements arrangements arranged in an array of rows and columns of pixel elements. In a typical electro-optical imaging embodiment, the pixel elements accumulate an analog voltage pixel signal proportional to incident radiation impinging on the pixel. This signal is represented in analog form in the array 24 and converted to digital form by an analog to digital converter 26 either coupled externally to an output register of the device 24 or built into the device 24. This is conventional in the art of electronic imaging devices. The digital pixel values are fed to an image processing unit or module 28. The module 28 consists of a processor and memory storing software instructions for performing certain calculations as described in detail herein, including calculations for determining the centers of the fiducial images, and for characterizing the optical system performance and obtaining distortion correction data, e.g., in the form of coefficients which can be applied to the image or portion thereof.

The location (pixel address) of the center of where the fiducial images are imaged on the image recording device is determined by an image processing module 28 using a centroid location algorithm. The image processing module uses such locations, and comparison of such locations to locations where such fiducial images would be imaged in an idealized or theoretical distortion free optical system, to generate distortion correction coefficients which characterize the errors or distortions in the optical system 10. Such distortion correction coefficients can be applied to the image or a portion thereof. One use of such distortion correction coefficients would be to apply the coefficients to the entire image and thereby generate a distortion corrected image. Another use would be to apply the distortion correction coefficients to a portion of the image (such as pixels representing some object of interest in the image) to generate either a distortion corrected image of the object of interest, or to obtain distortion corrected pixel address of the target of interest.

The software in the module 28 includes a module or subroutine for determining one or more distortion correction coefficients which characterize the distortions in the optical system. There are several possible distortion corrections that can be performed, including an inverse polynomial transformation correction which models magnification and distortion errors of the optical system, a rotation transformation correction, and a linear transformation correction. Additional corrections that can be applied include an astigmatism correction and a keystone correction. Preferably, the software includes modules calculating the inverse polynomial transformation correction, the translation correction and the rotation correction. Such corrections can be applied one at a time to the entire image or portion thereof.

In a preferred embodiment, the reference projector 18 is mounted within the optical system in a fixed manner and in a predetermined position with respect to the image recording device 24. The reference projector 18 is operated to illuminate the image recording device 24 with the projected beams 20 at the same time that the optical system is operated to generate an image of the scene of interest. The beams 20 are essentially superimposed on the scene radiation.

Furthermore, the reference projector 18 preferably projects radiation in a wavelength which is selected such that it is outside of the band where useful scene information is normally imaged by the image recording device, so as to minimize the effect of the fiducial images on the obtaining of useful scene information. In other words, the wavelength chosen for the optical projector 18 can be outside the normal imaging band for the camera. This takes advantage of band limiting filtering in the optical system. In one typical embodiment, the optical system in the form of a reconnaissance camera operates from 500 to 900 nanometers, and includes an interference coating that passes a small fraction of 920 mm energy. The projector projects the collimated beams at 920 nm. The loss due to the interference coating can be overcome by increasing the projector beam power, or increasing the on-time for the projector.

In one possible embodiment, the projector 18 projects an array of individual collimated light beams. The projector is designed to project the collimated light beams onto the periphery of the image recording device. The fiducial images are superimposed on the scene imagery, but at the periphery of the imagery. In some embodiments, particularly where multiple images are generated of a scene (such as in aerial reconnaissance) the loss of scene information in this peripheral area, where the beams are imaged, is of little or no consequence. To more fully characterize the optical system (including the performance closer to the central optical axis) at least some beams are preferably directed onto the central portion of the image recording device. By making the beams sufficiently small in size, and by judicious selection of the projection pattern of the collimated beams, complete characterization of the optical system without appreciable degradation in optical system performance is obtainable. A wide variety of projection patterns for the beams from the projector 18 are possible. A specific example consisting of three rows of beams in a fan configuration is described in detail below.

The illumination source for the projector 18 can take a variety of forms. A preferred embodiment is a laser that is coupled to a set of single mode optical fibers. A detailed description of a preferred projector 18 in the form of a multi-beam collimator is set forth below in conjunction with FIGS. 10-20.

To summarize, the embodiment of FIG. 1, and in particular the incorporation of the reference projector and the software routines in the image processing module as described herein, provide a facility by which the performance of the optical system 10 can be characterized and wherein compensation for distortion in the optical system can be performed automatically.

In particularly preferred embodiments, the distortion correction software includes routines that determine the location of the centers of the fiducial images from the projector 18 in the captured images, and compare such locations to the locations where such beams would have been imaged in the imaging device if the system were aberration and distortion free. Determining the locations where the beams would have been imaged if the optical system were aberration and distortion free is facilitated by an initial calibration step and storage of calibration data in a table, as described subsequently. From the fiducial images, distortion coefficients are then determined which map the actual location to the theoretical location. The distortion coefficients may perform translation, rotation or other transformations to the image, and such transformations can be applied in series to the image. The application of the distortion coefficients to a pixel location an object of interest results in a new, corrected pixel location. In alternative embodiments, the correction process could be applied to the entire image to generate a new corrected (undistorted) image. Examples are described below of various distortion correction processes, including 1) an inverse polynomial transformation correction modeling magnification and distortion errors of the optical system, 2) a rotation transformation correction, and 3) a linear transformation correction. Other corrections could be performed, including a "keystone" correction, "anamorphic distortion" correction, or others.

Note further that the reference projector 18 is preferably built into the precision optical system such that the projector projects the beams onto the imaging device at the time of each exposure of the imaging device. Therefore, the process of obtaining distortion correction coefficients can be performed in each image. Moreover, dynamic variation in optical system parameters which cause distortion errors, such as due to changes in temperature, pressure, misalignment due to vibration, can be compensated for automatically in every image.

The method of compensating for distortion errors in a precision optical system can be expressed as series of steps, as follows:

a) determining the location of where collimated beams from a projector 18 would be imaged by an image recording device 24 incorporated into the precision optical system if the optical system were distortion free;

b) obtaining an image of a scene along with the images of the collimated beams projected onto the image recording device by the projector and determining the location of the collimated beams in the image;

c) determining transformation coefficients that map the locations of the images of the collimated beams determined in step b) to the locations determined in step a); and d) applying the transformation coefficients to at least a portion of the image of the scene in step b), such that the optical system distortions are corrected.

A detailed explanation is provided below for determining transformation coefficients when the fiducial image locations (actual and theoretical) are expressed in a pixel address space. A similar methodology can be derived for determining the transformation coefficients when the fiducial image locations are translated from pixel locations into ray angles. Such a modification from the specifics of disclosure below is considered well within the ability of persons skilled in the art. Thus, the method for compensation of distortion errors can be expressed as follows:

a) obtaining an image of a scene along with an image of collimated beams of light projected onto an image recording device by a projector;

b) determining the locations on the image recording device of the collimated beams in the image and the associated true ray angles for the collimated beams;

c) determining the apparent incoming ray angles $\theta$ of the collimated beams from the locations on the image recording device (i.e., the ray angles that would occur if the optical system were distortion free) using the relation $\theta=\arctan(r/f)$, where r is a scalar distance from the location of the beams to the center of the image recording device and f is the focal length of the optical system;

d) determining transformation coefficients that map the true incoming ray angles determined in step b) to the apparent incoming ray angles determined in step c); and e) applying the transformation coefficients determined in step d) to at least a portion of the image to thereby correct optical system distortions.

The embodiment of FIG. 2 shows another embodiment in which an inertial measurement unit (IMU) 52 is incorporated into the camera and rigidly coupled (i.e., fixed) relative to the reference projector 18. For example, a metal bracket 53 is provided which has one end to which is fastened the reference projector 18 and another end to which is fastened the IMU 52. The bracket 53 is kinematically mounted to the optical system housing. The incorporation of the IMU 52 in a fixed, stable relationship to the reference projector 18 is particularly advantageous in an aerial reconnaissance embodiment. The projector 18 is used as explained above to generate beams from which fiducial images are obtained, and such fiducial images are used to generate performance characterization data and distortion correction coefficients. The projector 18 performs a second function, that is, to provide a reference coordinate system by which the angles in the projector coordinate system can be related to the position and orientation coordinate system of the IMU 52. The derivation use of such relationships between the coordinate systems, and compensation of distortion errors in the optical system, allows for increased accuracy in object geolocation from imagery. These aspects will be described in further detail in conjunction with the camera embodiment of FIGS. 6-9 and 21-26.

FIG. 3 is an illustration of the image recording device 24 of FIG. 1 or FIG. 2 in the form of an electro-optical imaging array (also referred to herein as focal plane array or FPA) that is arranged as a plurality of pixels in rows and columns of individual pixel elements 30. The fiducial images 32 are spots imaged by the array 24. Each fiducial image 32 is produced by a single collimated beam projected by the projector 18 of FIG. 1 or 2. There are a multitude of such fiducial images due to the fact that the projector 18 is designed to project a multitude of beams 20 (FIG. 1). As shown in FIG. 3, the fiducial images are preferably imaged at the edges of the array 24. Additional fiducial images are also preferably provided elsewhere (e.g., in the center) of the array 24 in order to obtain characterization information in the central portion of the optical system.

The array 24 further includes a clock 34 developing electrical pulses which are provided over clock lines 36 in order to shuffle accumulated charge (pixel information) from the pixels 30 through the array to an output register 38. Pixel data for the rows of the array are read out into the output register 38. The pixel data is fed to the A/D converter 26 (typically with 8, 12, or 16 bit quantization) and provided to the image processing unit 28. This is conventional in the art of electronic imaging devices. The IPU 28 executes routines coded in software for determining the centroid locations of the fiducial images 32, compares such centroid locations to locations where such fiducial images would be if the optical system 10 was in an idealized (distortion free) condition, and derives distortion correction coefficients that characterize the performance of the optical system and, when applied to the entire image or a portion thereof, compensate for such distortion.

In both the embodiment of FIG. 1 and the embodiment of FIG. 2, the exact position of each fiducial image 32 (FIG. 3) depends upon:

A) The ray angle of the collimated beam relative to the optical system optical axis.

B) The focal length, distortion, and flat mirror angles within the optical system.

C) The angle of a pointing mirror gimbal (if present in the optical system).

D) The position of the projector relative to the optical system.

By comparing the known relative angles between the various beams emitted by the projector 18 to the relative positions of their respective fiducial images formed by the image recording device 24, the magnification & distortion of the optical system can be deduced. The optical projector 18 can be constructed to produce as many collimated beams as are required to measure the various distortion effects. The beams could take the form of lines or points in a wide variety of possible configurations.

The overall position and rotation of the fiducial image pattern relates the orientation of the optical system (e.g., camera) and its pointing gimbal to the inertial measurement unit 52.

The relationship between the collimated beams 20 emitted by the optical projector 18 and the inertial measurement unit 52 reference axes needs to be determined for the situation where the characterization methods are being used for applications such as geolocation, mapping, navigation or passive targeting of weapons. This relationship may be determined by using the system 10 to record images of multiple surveyed targets, i.e., targets of precisely known location on the earth, such as a building, or surveyed location provided with a marker which can be detected in a reconnaissance image. The generation of such an image can be done in an initial flight test of the optical for calibration purposes, for example, in an aerial reconnaissance embodiment. The orientation and position of the optical system itself is measured by the inertial measurement assembly 52. The optical projector 18 is held in a fixed orientation with respect to the inertial measurement unit 52 (by means of bracket 53), hence the relative ray angles of the beams emitted by the optical projector 18 are known. The relationship between ray angles and image positions are known (i.e. magnification & distortion), thus the relative positions of the various fiducial images 32 to the images of the surveyed targets reveals the ray angles to the targets relative to the ray angles of the beams emitted by the optical projector. Because the position of the surveyed targets is known (they were surveyed) and the position and orientation of the inertial measurement unit is known, the ray angles to the target are known relative to the inertial measurement unit. Thus, the ray angles of the beams emitted by the optical projector can be determined in the coordinate system (i.e. relative to the reference axes of) the inertial measurement unit 52.

Because the inertial measurement unit 52 and the optical projector 18 are preferably mounted in a stable relationship by the measurement assembly using appropriately rigid mounting arrangements (bracket 53), the calibration of this relationship only needs to be done infrequently, perhaps only once, for example in the initial flight test mentioned above.

Note that the angular relationships among the various beams 20 emitted by the optical projector 18 and their angular relationship to the mounting of the optical projector relative to the inertial measurement unit 52 and bracket 53 ideally are stable, as well.

Figure 27:
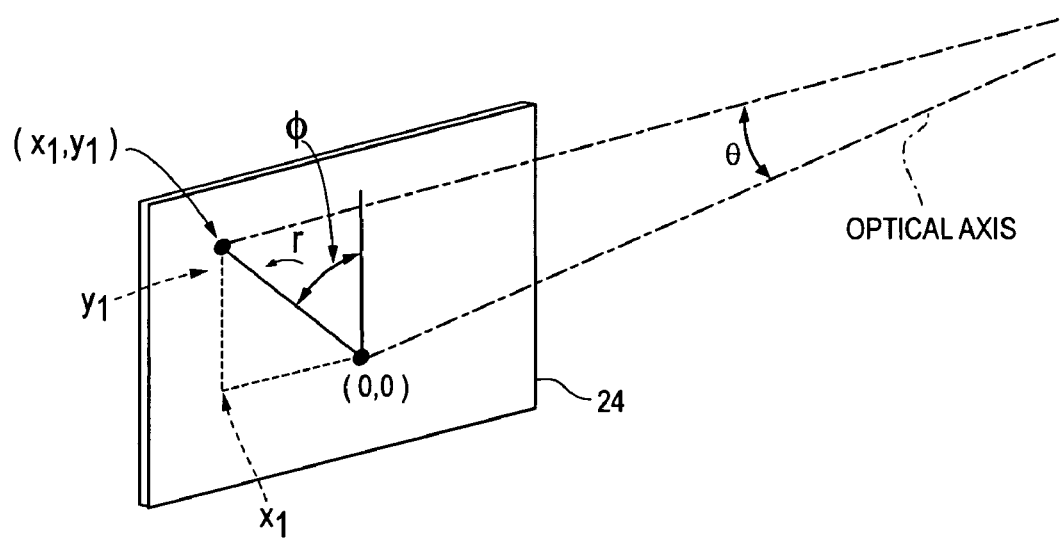
FIG. 27 is a schematic illustration of an imaging device in which a pixel of address (x1, y1) is of an object of interest, and showing the parameters r and θ in the relationship θ=arctan (r/f), wherein r is a scalar distance from the center of the array coinciding with the optical axis of the optical system to the pixel of interest, f is the focal length of the optical system, and θ is the ray angle from the camera optical axis to the point in the scene corresponding to the target pixel (x1, y1).

Once the calibration data described above is available, any image thereafter generated that contains fiducial images, along with the inertial measurement unit position and orientation data, where the image includes any target of potential interest, the ray angle from the target to the camera can be accurately calculated according to equation $\theta = \arctan(r/f)$, where f is the focal length of the optical system, r is a scalar distance from the center of the image recording device 24 (coincident with the center of the optical axis) to the pixel of interest associated with the target. See FIG. 27, for an example of pixel of address (x1, y1). The pixels of the image device 24 are given an addressing convention, e.g., a Cartesian coordinate system with pixel of address (0,0) being at the center. FIG. 27 also includes the parameter $\phi$, which is the rotation angle in a 2 dimensional polar coordinate system that identifies the angular position of the target pixel in the coordinate system for a given value of r, with the parameter $\phi$ obtained by converting the Cartesian pixel address to a rotation angle with 0 degrees predefined, for example, as the direction from the center of the array to pixels having a 0 x value and positive y values. The parameter $\phi$ gives a unique $\theta$ for a given value of r.

In the embodiment of FIG. 2, the fiducial images associated with the beams 20 act as stars or surveyed monuments, as they can be related to inertial measurement unit position and orientation after the initial calibration is completed. The fiducial images are also used to characterize the performance of the optical system and used to derive distortion correction coefficients, as explained herein.

Because camera images formed by a lens are two-dimensional, only the ray from the camera through the target is determined by a single image. The target's position along that ray (indicating its precise location in three dimensions) can be determined with a second camera image of the target, taken from a different camera position and orientation known from inertial measurement unit 52 data. The second image also includes fiducial images 32, and a second ray from the second camera position to the target can be determined.

Because both rays intersect at one point (the target), the position of the target can be determined. To be precise, the rays may not intersect exactly, due to measurement and calculation errors. In that case, the closest approach between the two rays approximates the target position.

The techniques as described above can be applied in many areas—determination of target coordinates in reconnaissance camera images, passive determination of range from a camera to a target, elevation & azimuth measurements for weapons sighting, and remote mapping (without establishing ground reference points). The system could be "reversed", where known monuments could be imaged, and the camera positions and orientation are deduced, to navigate (i.e., determine the location of a vehicle carrying the optical system), or to calibrate a navigation system.

Other forms of navigation devices can be used to determine camera location or attitude, such as celestial navigation. Likewise, other means could be used to determine camera orientation.

Similarly, the optical projector 18 could emit a collection of unidirectional beams that image as approximately circular spots. These beams can be arranged in various patterns to measure camera distortion, magnification and pointing. Or, the optical projector 18 could emit fanned beams, that image as lines, again arranged in various patterns.

The optical system of FIG. 1 or 2 can use any imaging technology-reflective, refractive, or both. Images can be recorded on film or electro-optical arrays, or by any other image recording means.

B. Optical System Characterization and Distortion Corrections

Before describing the illustrated embodiments further, a brief explanation will be provided of the optical system characterization and distortion correction that is made possible by the use of the optical reference projector 18 and the capturing and processing of fiducial images as explained herein. The term "distortion" is used in a general sense to refer to any of a variety of errors, including magnification or focus errors, translation errors, rotation errors, radial distortion errors, or otherwise, the cause of which (whether mechanical, e.g., misalignment, optical, or environmental) is not particularly important.

With reference now to FIG. 4A, a focal plane array 24 is shown with a rectangular boundary 40 indicating the perimeter of an image that would be generated from the array if the optical system were entirely free of distortion errors. Point 44 indicates the center of the array 24 and is coincident with the optical axis of the optical system 10. Element 46 represents an arbitrary region in the image, and could for example represent the area where a fiducial image occurs representing a single beam from the projector 18 of FIG. 1. As shown in FIG. 4A, magnification errors can be introduced into the image, whereby the boundary of the image is enlarged to the position 42. This moves the location of the element 46 up and over to the left slightly. The amount of magnification error is typically the same through the focal plane and extends outwardly from the center 44.

FIG. 4B shows an example of a translation error. The center 44' of the image 42 is moved down and to the left by the amount Δx and Δy. Similarly, the element 46 is moved down and to the left as indicated at 46'.

FIG. 4C shows an example of a rotation error. The center 44 remains the same by the image 42 is rotated clockwise. The element 46 is moved over and up to the right as indicated at position 46'.

FIG. 4D shows an example of radial distortion. With radial distortion, the magnification varies as a function of the radial distance away from the center 44. The location of the element 46 is moved slightly inward from the ideal position as indicated at 46'.

FIG. 4E shows an example image 42 which includes all of the errors illustrated in FIGS. 4A-4D. The errors may typically exist independently from each other and can be summed together to get the composite or total image distortion as shown in FIG. 4E. As noted above, a complex optical system such as a microscope, telescope or aerial reconnaissance camera may have multiple degrees of freedom and possible sources of errors (optical imperfections, alignment errors, errors due to temperature, humidity, expansion or contraction of components, etc.) but the present inventive concepts do not need to identify the source of such errors. Rather, the total cumulative effect is determined—by determination of the location of the fiducial images in an image generated by the imaging device and by comparison of the location of the fiducial images to the location where such images would have been imaged had such errors not been present (determined in an initial calibration step). Now that the optical performance has been characterized, it is possible to calculate transformation coefficients (or, equivalently transformation relationships) that can be applied to map or move pixel addresses from actual addresses to ideal address representing a distortion free optical system which, when applied to the image or a portion thereof, essentially remove the net distortion effects shown in FIG. 4E.

Figure 5A:
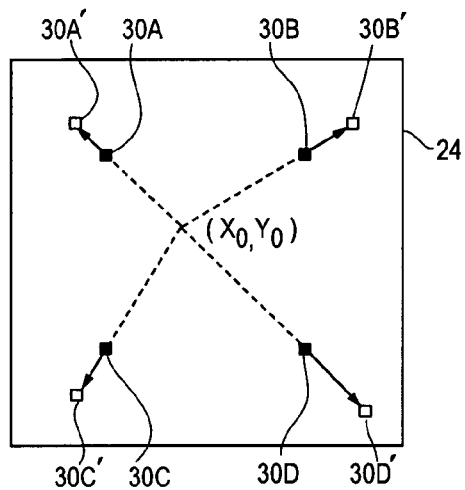
FIGS. 5A-5C show inverse polynomial, rotation, and translation distortion correction transformations, respectively, which can be applied to a portion of an image, or an entire image, to compensate for the image disturbance shown in FIG. 4E. The generation of coefficients to perform the correction transformations shown in FIGS. 5A-5C is obtained by an image processing module using fiducial images generated from the beams from the reference projector of FIGS. 1 and 2.

FIG. 5A shows three types of distortion correction transformations that can be derived from the fiducial images as explained herein. The first one (FIG. 5A) is an inverse polynomial transformation. The transformation is centered at a given pixel with coordinates (x0, y0) (which need not be at the origin or center of the imaging device.) The transformation moves points 30A, 30B, 30C and 30D outward away from the pixel (x0, y0) to new locations 30A', 30B', 30C' and 30D'. To find the inverse polynomial transformation, an initial transformation function PT is computed as follows:

$$PT(\{x, y\}, \{x_0, y_0\}, \{a_0, a_1, \ldots, a_n\}) = \{x_0, y_0\} + (\{x, y\} - \{x_0, y_0\})\sum_{k=0}^{n} a_k r^k$$

where $a_0$, $a_1$, $a_2$, ... are coefficients representing radial distortion and r is distance from a selected pixel to the optical axis.

The inverse is then computed by the following relation:

$$IPT(\{x', y'\}, \{x_0, y_0\}, \{a_0, a_1, \ldots, a_n\}) = \{x_0, y_0\} + \frac{(\{x', y'\} - \{x_0, y_0\})}{\sum_{k=0}^{n} a_k r^k}$$

The even order terms in the inverse transformation model the magnification and distortion in the optical system.

Figure 5B:
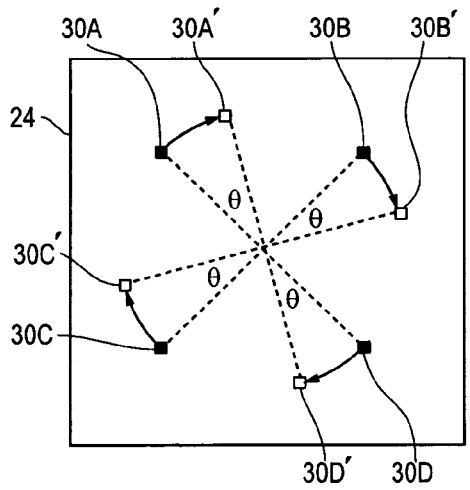

A second transformation is shown in FIG. 5B. This is a rotational transformation of pixel addresses about the center of the array by an amount equal to the rotational angle θ. The pixels with addresses 30A, 30B, 30C and 30D are moved to new locations 30A', 30B', 30C', 30D'. The transformation models the rotation of the image with respect to the focal plane array 24. The rotation transformation is given by the expression:

$$ROT(\{x,y\},\theta)=\{x \cos \theta - y \sin \theta, +x \sin \theta + y \cos \theta\}$$

Figure 5C:
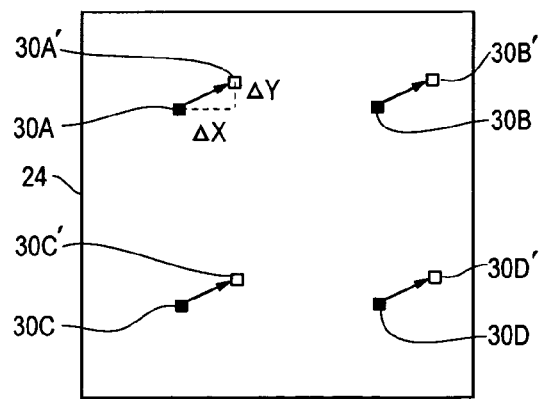

A third transformation is shown in FIG. 5C. This is a linear transformation in X and Y directions and models linear translation of the image with respect to the focal plane array 24.

The transformation is given by the following relationship:

$$LT(\{x,y\},\{\Delta x,\Delta y\})=\{x,y\}+\{\Delta x,\Delta y\}$$

Figure 24:
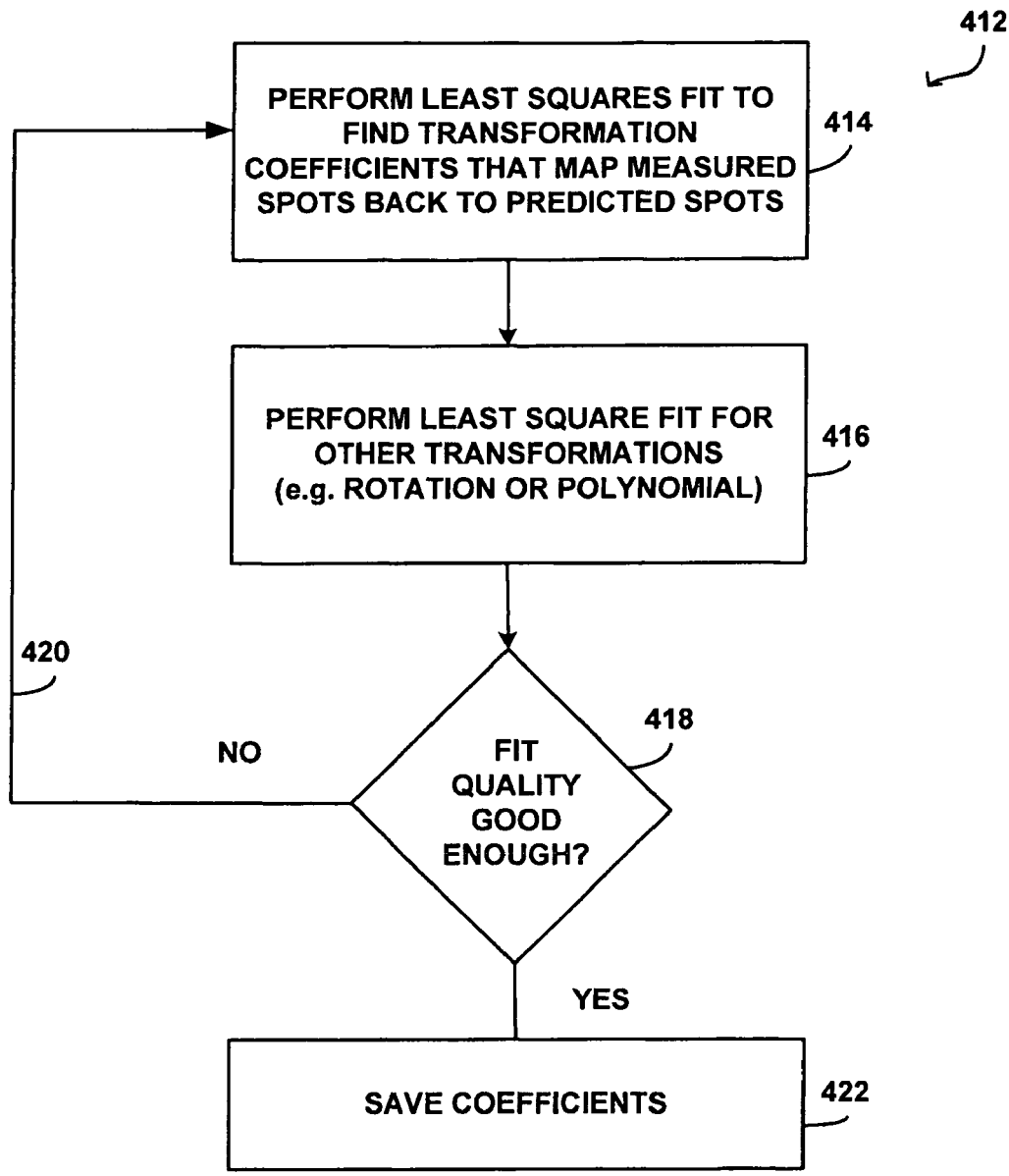
FIG. 24 is a more detailed illustration of a process for estimating or determining the distortion correction coefficients in the process of FIG. 24.

The derivation of the transformation coefficients for the transformations of FIGS. 5A-5C will be explained later in conjunction with FIG. 24. A further explanation is also attached as an Appendix. These explanations are provided for the situation where fiducial image locations are expressed as pixel coordinates. As noted above, such locations could be translated into ray angles (using the relation θ=arctan (r/f) and a similar set of transformation coefficients obtained in the ray angle space.

In the embodiment of FIGS. 1 and 2, the mirror 14 (or other component) may be subject to controlled movement during generation of images by the image recording device. This mirror 14 may for example be a mirror that scans in an azimuthal direction for purposes of forward motion compensation in an aerial reconnaissance camera embodiment. Ideally, the initial calibration data for the theoretical position of the fiducial images in an idealized, distortion free optical system is obtained for a multitude of incremental positions of this moveable element. This way, when a given image is taken and one wishes to determine the optical system characterization and compute the distortion correction coefficients, one can ascertain the position of the azimuthal mirror 14 at the time of the exposure and use the associated calibration data of the fiducial images at that azimuthal mirror position. Hence, during the initial calibration event, when theoretical positions of the fiducial images is determined, such positions are determined for all of the available azimuthal mirror 14 positions (or a sufficient subset of positions whereby interpolation is possible) and such position data is stored in memory (e.g., in a memory associated with the image processing unit 28 of FIG. 1). Then, when the distortion correction coefficients are derived, they are related to the data set associated with the current azimuthal mirror position. Obviously, this technique of obtaining calibration data for multiple positions of a moveable element can be extended to other types of moveable elements.

Alternatively, fiducial image positions can be determined by measuring the angular relationships among the MBC beams, and then predicting where the beams would form an image, given the position of any azimuthal mirror or other adjustable element position, with the assumption that the camera imaging is undistorted and of known focal length.

The distortion compensation transformations of FIGS. 5A-5C can be applied one at a time to an image or a given pixel address. In some embodiments, only one or two of the three transformations may need to be performed and the software routines in the image processing module may only contain instructions for one or two of the transformations. In other embodiments, all three transformations are performed. Still other transformations could be obtained from the fiducial image data, including a keystone transformation (due to tilt in the image recording device towards or away from the focal plane), an "anamorphic distortion" correction transformation, and still others.

First Reconnaissance Camera Embodiment

The reader's attention is now directed to FIGS. 6-9 and the following discussion of an aerial reconnaissance camera that includes both the reference projector 18 and an inertial measurement unit 52 and implements the features describe above in conjunction with FIG. 2.

Figure 6:
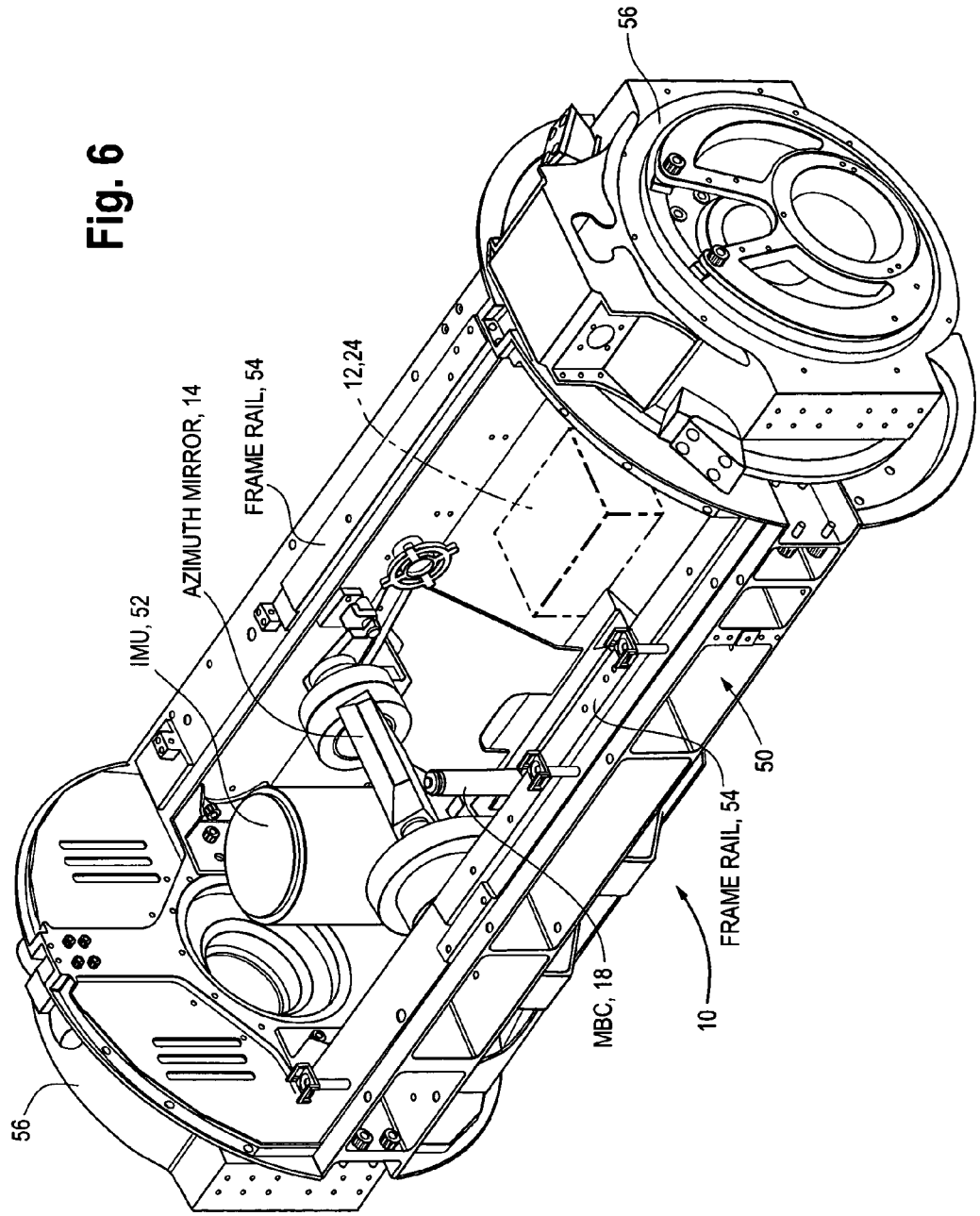
FIG. 6 is a perspective view of a portion of an aerial reconnaissance camera, showing an inertial measurement unit rigidly coupled to a reference projector in the form of a multi-beam collimator (MBC) incorporated into the camera. The components of the optical system in the optical path from an azimuth mirror to an image recording device are not shown in FIG. 6 in order to more clearly illustrate the MBC reference projector and the inertial measurement unit. The construction, performance, and design details of the aerial reconnaissance camera are not important and wide variation is possible from the specifics of the disclosed reconnaissance camera without departure from the scope of the present invention.

FIG. 6 is a perspective view of a portion of an optical system 10 taking the form of an aerial reconnaissance camera. The optical system includes a set of optical elements, lenses, and other components for imaging e.g. in the visible or infrared spectrum, such elements are indicated generally as box 12 and are not shown in FIG. 6 in order to better illustrate the other components of the camera. Similarly, an electro-optical focal plane array 24 is included in the camera, but is not shown in FIG. 6. These details are not particularly important, and the reader is directed to U.S. Pat. No. 6,826,358, which is incorporated by reference, for a further description. The camera could also be of a hyperspectral design as disclosed in U.S. Pat. No. 6,831,688, also incorporated by reference herein. U.S. Pat. No. 5,668,593 discloses another aerial reconnaissance camera optical system which could be adapted for use in the present invention. The concepts of this disclosure apply generally to reconnaissance cameras and the specific camera design is not critical.

The illustrated embodiment of FIG. 6 includes roll motors 56 which rotate the camera about a roll axis of a reconnaissance vehicle. The camera includes a camera housing 50, frame rails 54 extending between the roll motors 56, an inertial measurement unit 52, an azimuth mirror 14, and a reference projector 18 in the form of a multi-beam collimator (MBC). The optical system 10 further includes an objective optical system (not shown) which may be of a Cassegrain or Catadioptric type. The azimuth mirror 14 directs scene radiation into the optical components indicated at 12. The azimuth mirror 14 may move as described in U.S. Pat. No. 6,826,358 to perform forward motion compensation (FMC), or, alternatively, FMC may be performed electronically "on-chip", in which case mirror may not move or move in some other manner, e.g., for purposes of camera pointing. MBC projector 18 is positioned in the optical path such that the beams from the projector 12 likewise are directed into the optical components 12 and are imaged on the array 24.

The inertial measurement unit 52 is rigidly coupled to the MBC reference projector 12 and both units are incorporated into the camera housing by suitable mounting arrangements.

Figure 7:
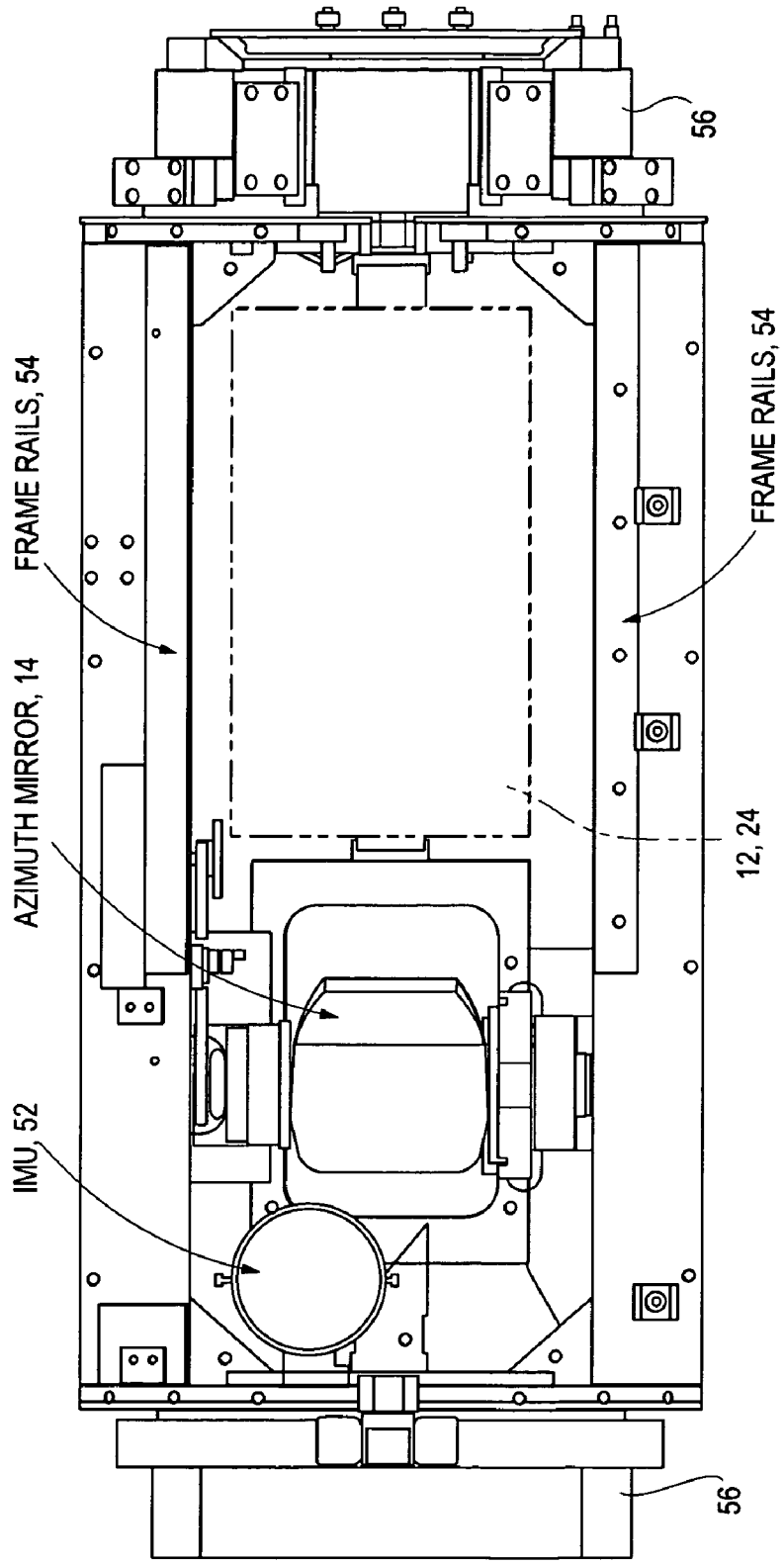
FIG. 7 is a bottom plan view of the reconnaissance camera of FIG. 6.
Figure 8:
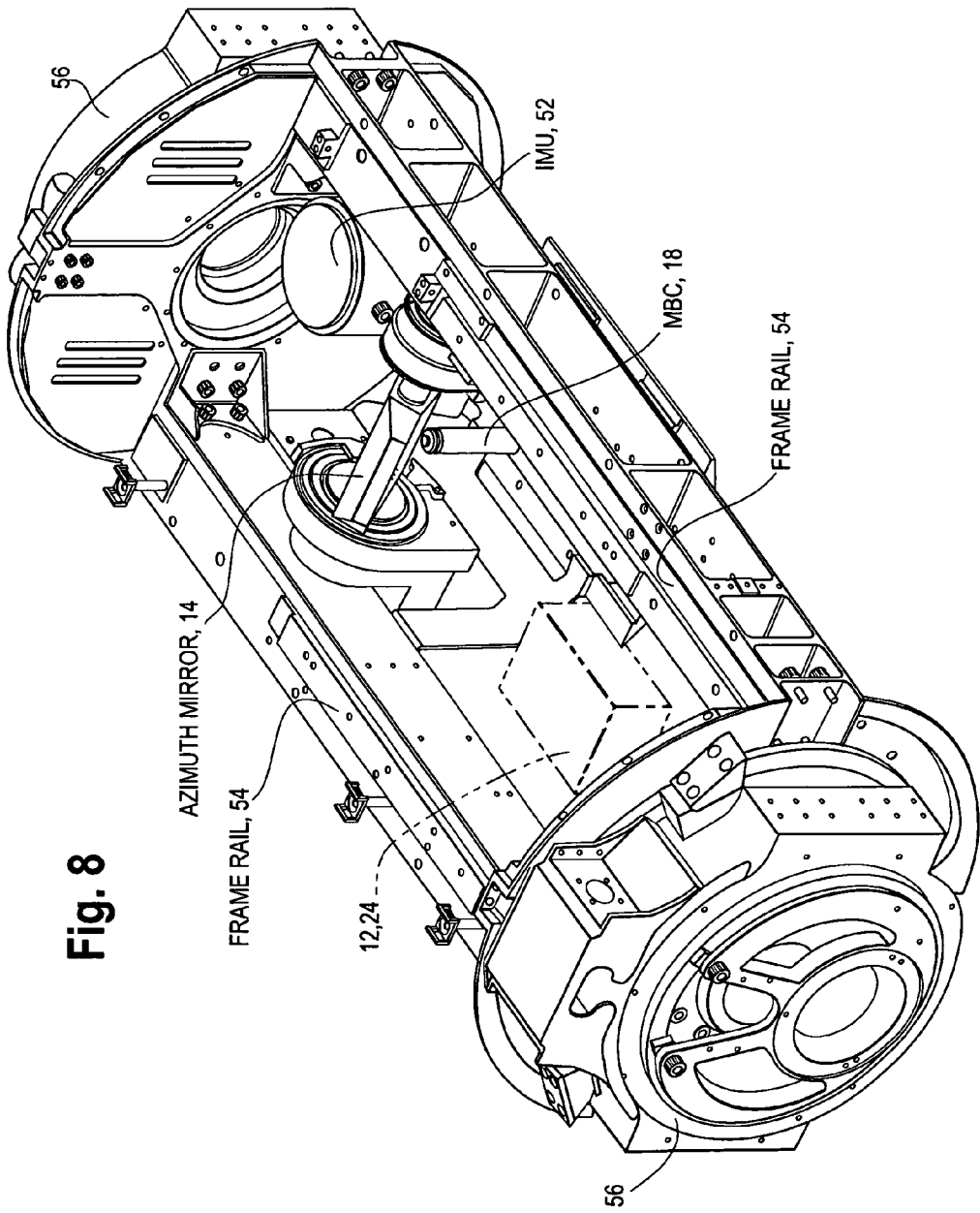
FIG. 8 is another perspective view of the reconnaissance camera of FIG. 6.
Figure 9:
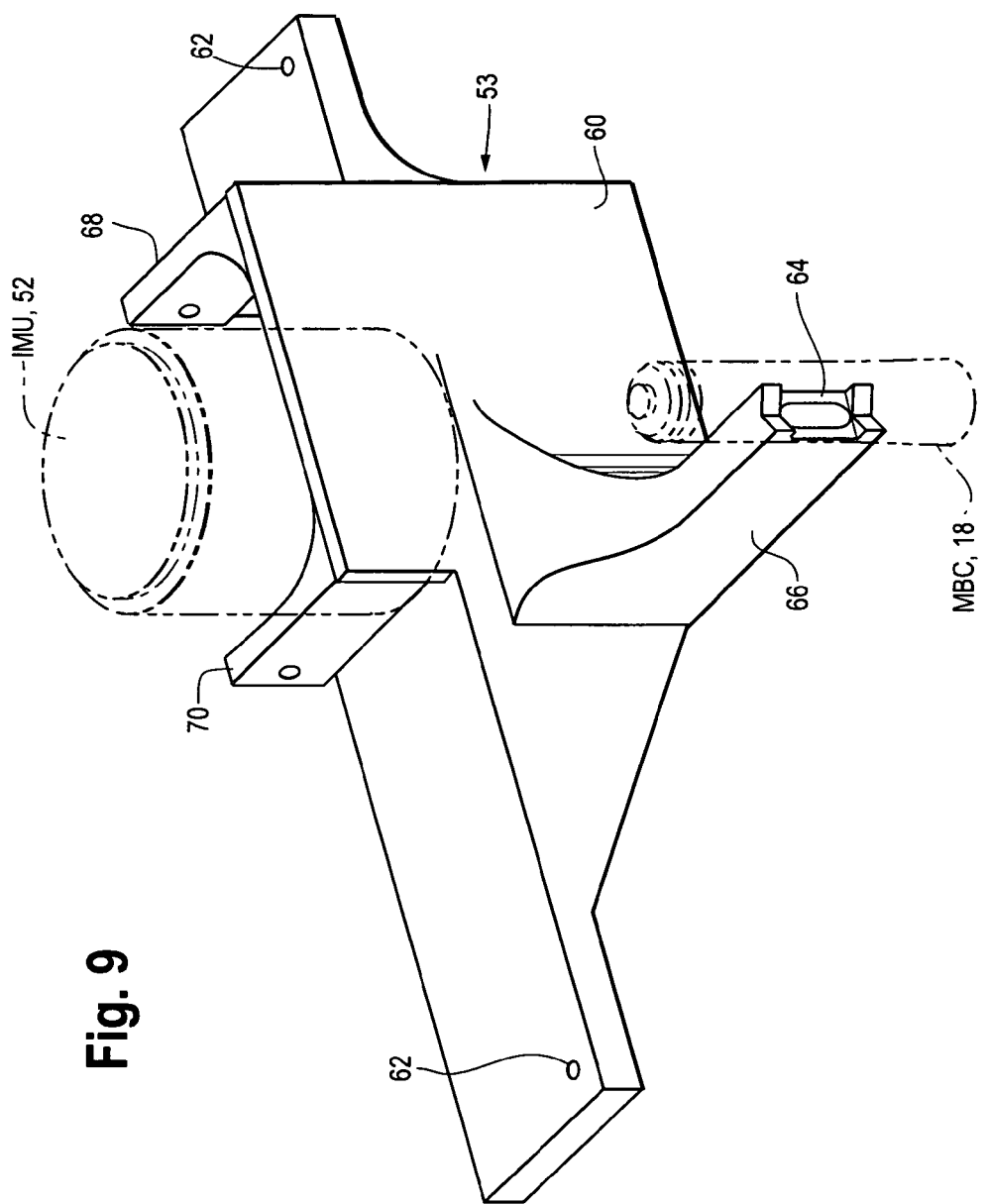
FIG. 9 is a perspective view of a mounting bracket that couples the inertial measurement unit to the MBC collimator in the reconnaissance camera of FIGS. 6-8.

FIG. 7 is a bottom plan view of the reconnaissance camera of FIG. 6. FIG. 8 is another perspective view of the reconnaissance camera of FIG. 6. The IMU 52 and the MBC projector 18 are rigidly coupled to each other by means of their mutual mounting to a common bracket that is fastened securely to the frame rails 54. The bracket 53 is shown isolated in FIG. 9. The bracket 53 includes a body 60, made from a suitable material such as steel or aluminum alloy. The body 60 has mounting holes 62 for fastening to the frame rails 54. The body 60 includes a first arm 66 having a peripheral portion 64 to which the MBC projector 18 (shown in dashed lines) is rigidly fastened. Similarly, the body 60 includes wing elements 68 and 70 which are used as a feature to attach the inertial measurement unit 52 (shown in dashed lines).

The reconnaissance camera of FIGS. 6-9 can be used for any reconnaissance purpose. One preferred embodiment issued for capturing images of the earth from a moving aircraft and performing geolocation of objects of interest in the scene imaged by the imaging device 24. As such, the camera includes the inertial measurement unit 52 for purposes described previously.

To perform such geolocation, the projector 18 is assigned a coordinate system for describing the angles of various beams that exit the projector, and a process is described below for converting pixel locations for the beams in an image to angles in this coordinate system. The inertial measurement unit (IMU) 52 likewise includes a reference coordinate system for describing its position and orientation in space. The IMU has the ability to measure both its position and its orientation in space. As provided by the bracket 53 of FIG. 9, the projector 18 is rigidly, mechanically coupled to the IMU 52, and thus a fixed relationship is established between the coordinate systems of the IMU and the projector.

This relationship between projector and IMU coordinate systems can be expressed mathematically as a direction cosine matrix. This matrix allows an angle, expressed as a vector in one coordinate space (the projector 18 coordinate space), to be transformed to the other coordinate space (the IMU 52 coordinate space). Thus, for a camera in accordance with this construction, one can calculate the angle to the unknown target in the projector coordinate space using the relationship $\theta = \arctan(r/f)$, multiply this angle by the direction cosine matrix that transforms from the projector to IMU coordinates, and the result is the angle to the target in the IMU coordinate space. This angle is useful for determining the location of the target is on the surface of the earth. Two such angles from two images captured at two different camera positions determine the target location as the intersection of the two angles.

Figure 25A:
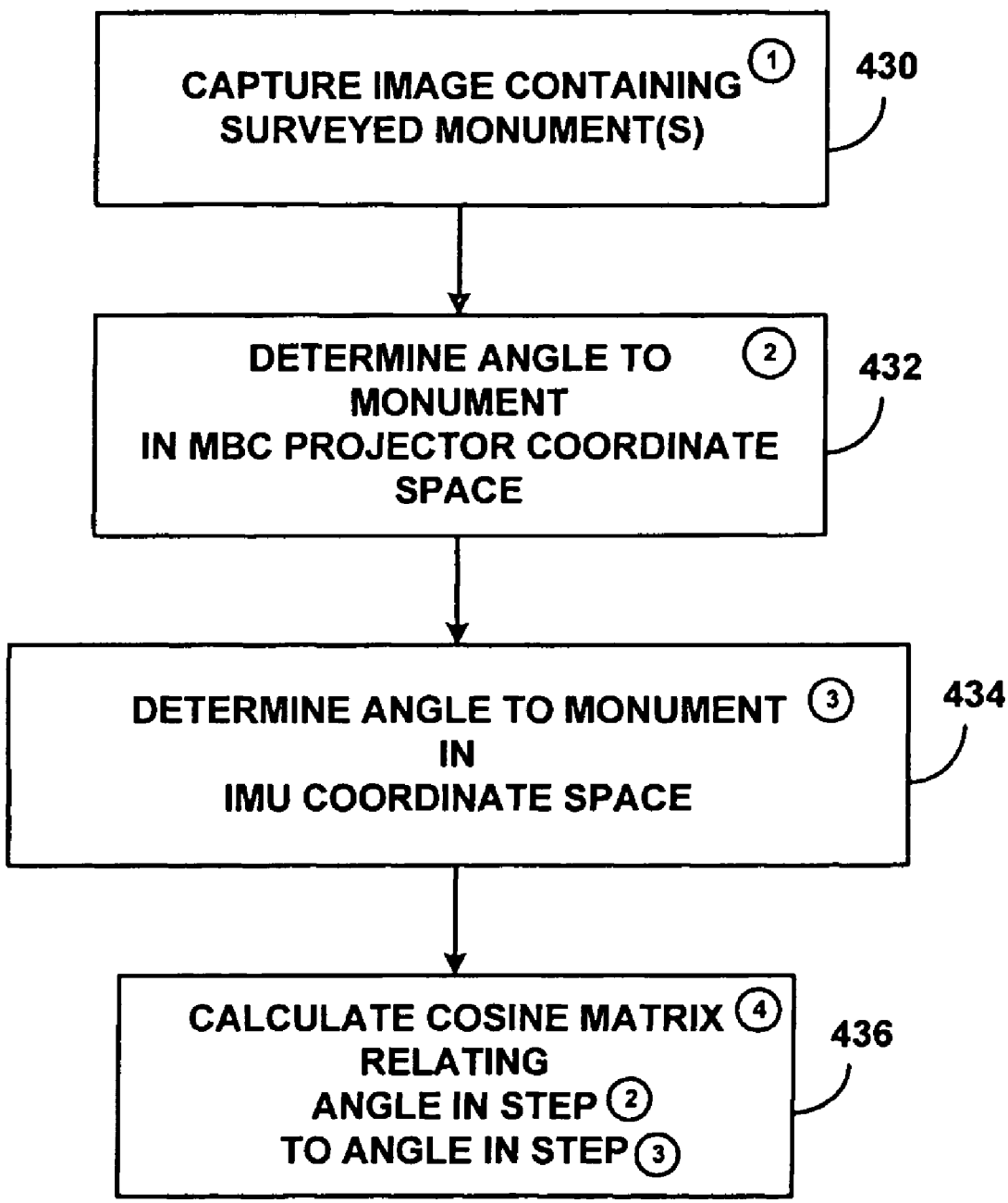
FIG. 25A is a flow chart showing a process for determining a direction cosine matrix relating the MBC projector coordinate space to an inertial measurement unit coordinate space. The direction cosine matrix is used, for example, in a geolocation from imagery application of the invention.

The direction cosine matrix can be ascertained by what is referred to herein as a boresighting process. The process is shown in FIG. 25A. The first step 430 in the boresighting process is to capture an image that contains two monuments (or targets) on the ground whose positions have been determined with suitable accuracy. The term "surveyed" means that the position is known in the position coordinate system of the IMU. This position coordinate system could be expressed, for example, in a spherical coordinate system, such as latitude, longitude and elevation above sea level, as in the case of a GPS satellite navigation system. Because the IMU 52 measures the location and orientation of the camera when the image of the monuments is captured, and the monument positions are known, the angle between the IMU 52 and one of the monuments on the ground (the first monument) is also known, in the angular coordinate space of the IMU.

The second step 432 is to determine the angle to the monument in the projector coordinate space. This can be done by capturing the image of the monument, measuring camera distortion (as explained above using the fiducial images), compensating for the distortion (e.g., by performing the distortion correction processes of FIG. 5), and converting the pixel positions of the monument in the image to a ray angle in the projector coordinate space using the relationship $\theta=\arctan(r/f)$.

The next step 434 is to determine the angle to the first monument in the IMU coordinate space.

Now, at step 436, for the camera imaging the surveyed first monument, we have the same ray, described in the IMU orientation coordinate space, and described in the projector coordinate space. The difference in the ray descriptions is necessary, but not sufficient data to describe the coordinate transformation between IMU orientation coordinate space and projector coordinate space, because the relative rotation around the ray between these coordinate spaces is not specified. The direction from the first image to the image of the second monument (after correcting for the camera distortion using the processes of FIG. 5) gives the angle normal to the first monument ray in the projector coordinates. Likewise, using the known surveyed position of the second monument and the IMU position and orientation, a second ray from the camera to the second monument can be described in IMU orientation coordinate space. By comparing the direction from the first monument ray to the second monument ray, the angle toward the second monument ray that is normal to the first monument ray is known in IMU orientation coordinate space. Because this normal direction angle from the first monument ray to the second monument ray is known in both coordinate spaces, the amount of rotation around the first monument ray is measured, and sufficient information is known to unambiguously translate between the IMU orientation coordinate space and the projector coordinate space.

A direction cosine matrix that transforms from the projector 18 to the IMU 52 space can now be calculated directly. Thereafter, for any image of the earth generated by the camera, the direction cosine matrix can be used to translate from the angle to the object of interest from the projector coordinate system to the IMU positional coordinate system and therefore the position of the object on the ground in the IMU positional coordinate system can be determined.

Step (2) in FIG. 25A, determining the angle to the surveyed monument in the MBC projector 18 coordinate space is shown broken down into sub-steps in FIG. 25B. The process includes a first step 438 of measuring the camera distortion coefficients (inverse polynomial, rotation, translation and possibly others) from the fiducial images and comparison of such images to fiducial image locations in an ideal, distortion free optical system. The next step 440 is to locate the target (monument) in the image and obtain the pixel address of the target. At step 442, the distortion coefficients are applied to the pixel address of the target and a new, corrected pixel address is calculated. From this, the scalar distance r is determined. At step 444, the relationship $\theta=\arctan(r/f)$ is applied resulting in ray angle in the MBC projector reference coordinates system. Then, at step 446, angle $\theta$ is rotated about the Azimuth mirror resolver reading. The second monument is captured in the same scene image to resolve the ambiguity of rotation around the ray to the first monument.

One embodiment of a reconnaissance camera as shown in FIGS. 6-9 is predicted to achieve a 5 meter positional accuracy with a 20 km standoff range to the reconnaissance camera. That is, the system is expected to determine target position to within 5 meters in all dimensions, from a range of 20 kilometers, using an aspect angle of approximately 5 degrees between two images. This performance requires an overall system accuracy of about 40 microradians (error in aspect between the two target rays).

This error budget is divided between the inertial measurement unit 52, errors in designating the target (identifying pixel addresses of the target), and camera measurement errors. For the exemplary system described herein, the camera measurement budget is approximately 10 microradians.

Camera measurement errors include the following components:

a) Changes in the relative orientation of the optical projector 18 and inertial measurement unit 52.

b) Changes in the pattern of beams emitted from the optical projector 18.

c) Changes in the orientation of the measurement assembly (IMU+projector) relative to the camera housing 50 that occur during the exposure of a single image.

d) Measurement accuracy of fiducial image positions in an image recorded by the image recording device 24.

e) Accuracy of the distortion and magnification model.

f) Scene clutter interfering with fiducial images, degrading the fiducial image position measurements.

g) Accuracy of timing relationships between scene image exposure, fiducial image exposure, and inertial measurement unit position and orientation data.

Camera measurement error component (a) is addressed by using a very stiff mounting for the measurement assembly (bracket 53 plus attached MBC projector 18 and IMU 52). This must be stable over time and all operating conditions (camera orientation, gravity, altitude, temperature, etc.).

Camera measurement error component (b) is addressed by making the optical projector 18 stable. This is done in optics by choice of mounting materials, choices of optical glasses, and orientation of surfaces where air pressure varies. The stability of the reticle in the projector that creates the beam pattern in the projector must also be considered as part of the optical projector design.

Camera measurement error component (c) is addressed by a stable, kinematic mount of the measurement assembly to the camera structure. Also, any vibration sources (such as mechanical dither of ring laser gyros contained in the inertial measurement unit 52) must not distort the measurement assembly.

Camera measurement error component (d) is addressed in an electro-optical camera with a relatively large instantaneous field of view for each pixel of the image recording device (e.g., 22 microradian instantaneous field of view per pixel), by using large fiducial images relative to the image detector pixel size. These large fiducial images allow pixel spatial quantization errors to be averaged out by calculating the centroid location of the fiducial image. The centroid location is calculated by ignoring dark pixels, below a minimum threshold, and the remaining pixel positions are weighted by their brightness and averaged. Large (15-20 pixel diameter) fiducial images are preferred over small, sharp fiducial images, in electro-optical applications, or other applications. One means of providing large fiducial images is by introducing diffraction.

Camera measurement error component (e) is addressed by considering all of the potential sources of distortion-(geometrical distortion, focal length/magnification, keystone distortion, position of lens optical axis on the focal plane, and flat-mirror angles in collimated space). Sufficient fiducial images, each with 2 degrees of freedom, must be present in each image to allow calculation of a sufficient number of parameters to describe each effect with the required accuracy.

Camera measurement error component (f) is a concern because of the large fiducial image size. Adding scene clutter to part of the fiducial image skews (introduces error into) the centroid calculation. This is addressed by using a single light wavelength to project from the optical projector. This is used to advantage in several ways—

1. Bandpass filtering, that passes only the wavelength from the optical projector 18, is incorporated at the focal plane (or just in front of the focal plane), in the areas where fiducial images are expected. Other areas of the focal plane are not bandpass filtered, to allow unfiltered imaging of target scenes. The effect of the bandpass filter is to exclude most of the light from the target, which will ordinarily be broad in spectrum. Only scene illumination at the bandpass wavelength will cause clutter. If the bandpass filter is sufficiently narrow, this scene clutter will be minimal.

2. The wavelength chosen for the optical projector 18 can be one that is not normally contained in the scene. For example, the illustrated reconnaissance camera embodiment uses a projector 18 of a wavelength of 920 nm, which is also an absorption line for water.

3. The wavelength chosen for the optical projector can be outside the normal imaging band for the camera. This takes advantage of band limiting filtering in the camera. In one typical embodiment, the camera operates from 500 to 900 nanometers, with optics that include an interference coating that also passes only a small fraction of 920 nm energy. The projector projects the fiducial beams at 920 nm. The loss due to the interference coating can be overcome by increasing the beam power, or increasing the on-time or duty cycle for the optical projector 18.

Camera measurement error component (g) is also addressed in the preferred embodiment. In particular, there is some degradation of accuracy due to the time quantization of the shutter timing signal. The subject camera uses a digitally controlled shutter having a pair of moving slits that pass over the focal plane array. See U.S. Pat. No. 6,510,282 for further details. This error component is addressed by reducing the quantization error of the shutter timing signal to a minimum amount that is feasible. The timing of the shutter slit passing over the array dictates the timing of the exposure of the array to image the target in the scene. The quantization of the shutter timing results in uncertainty of the timing of the exposure of the camera when the imaging of the target is captured, and resultant resulting position of the camera. The shutter digital signal processor outputs timing signals with 256 microsecond quantization error in a representative embodiment. Thus, the timing error is roughly 0-256 microseconds late. At a camera velocity of 200 kts, 256 microseconds in shutter error results in 2.6 centimeters position error, which is acceptable.

Figure 21:
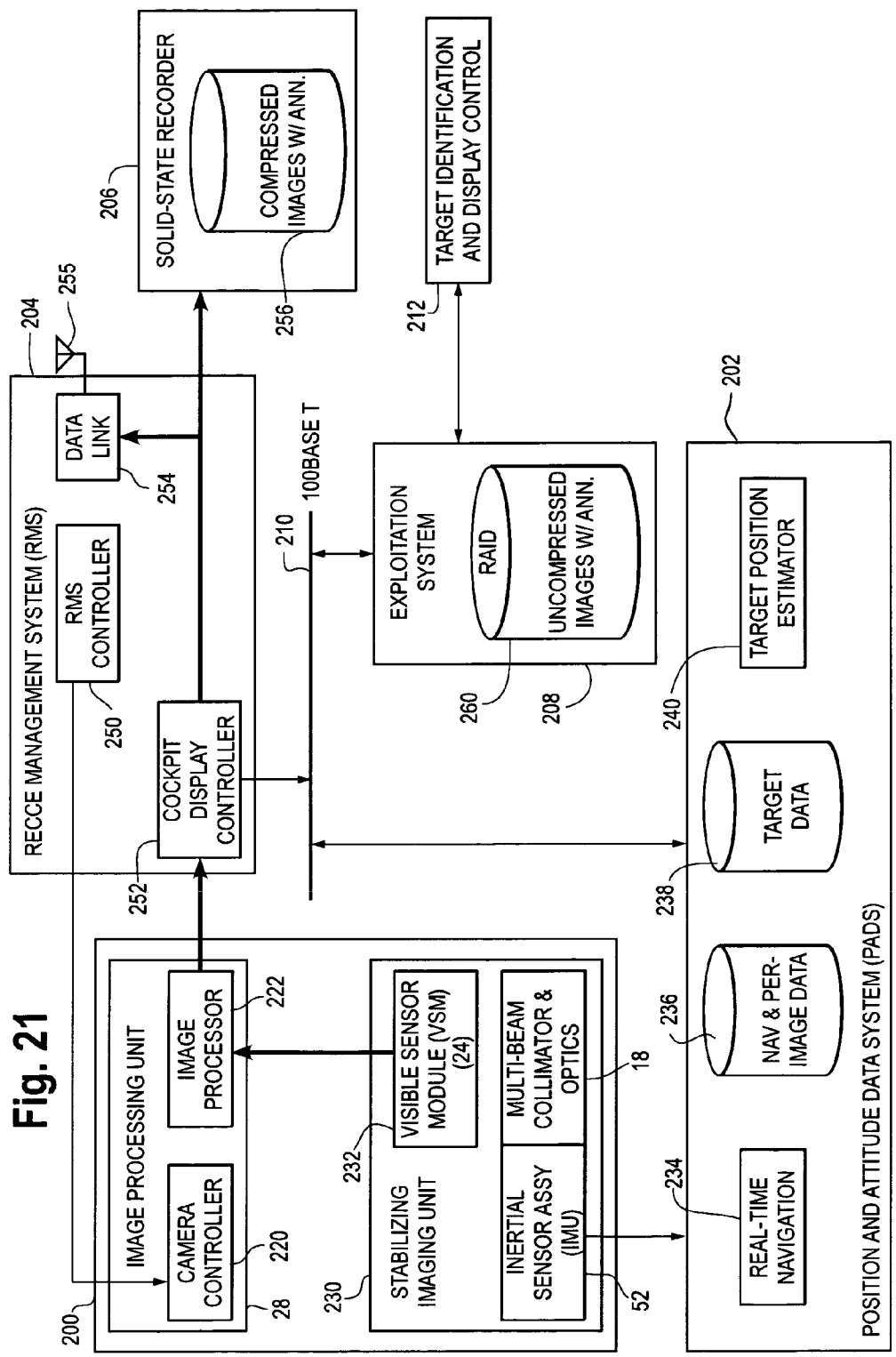
FIG. 21 is a block diagram of the reconnaissance camera and peripheral electronics modules for geolocation.

The reconnaissance camera of FIGS. 6-9 and associated peripheral electronics units is shown in a block diagram form in FIG. 21. The system includes the camera 200, which includes an image processing unit 28 and a stabilized imaging unit 230. The image processing unit 28 may take the form of a computing device with suitable microprocessor and memory for storing software routines as described herein for operating on captured images to perform such functions as centroid calculation, calculation of a direction cosine matrix, and calculation of distortion correction coefficients. The image processor includes a camera controller 220 and an image processor 222.

The stabilized imaging unit 230 includes a visible sensor module 232 (including the focal plane array (image recording device) 24 and associated electronics, clocks, cooling systems, etc.), the inertial measurement unit 52, and the multibeam collimator reference projector 18 and its associated optics described in further detail below.

The system further includes a position and attitude data system 202 which includes a real-time navigation unit 234, a navigation and per image data store 236, a target data store 238, and a target position estimator 240. Module 234 may receive data from an aircraft navigation system. Data stores 236 and 236 may take the form of hard disk or other memory modules. Target position estimator may take the form of a processing unit and software that receives ray angles from the imaging device 24 and performs geolocation calculations as explained herein.

The system further includes a reconnaissance management system 204 including a controller 250 supplying inputs to a camera controller 220. The image processor provides uncompressed images to cockpit display controller 252 which can store several images and present them in a waterfall display. The uncompressed images, along with navigational, positional, or other annotation data can be also be supplied to image storage devices, and downlinking devices. The management system 204 further includes a data link 254 coupled to an antenna 255 for transmission of image and annotation data to a ground station over an RF air interface. Compressed images are further supplied to a solid state recorder 256 which stores images with annotation data (e.g., resolver positions, centroid locations, navigation or position data from the IMU etc.)

The system may also include an exploitation system 208 including an array of disk media storage devices 260 where uncompressed images along with annotation data can be stored. A target identification and display control module 212 accesses the uncompressed data in the storage devices 260.

The modules 200, 202, 204, and 208 are preferably linked via a high speed computer network or bus, such as a 100baseT (Fast Ethernet) network.

Figure 22:
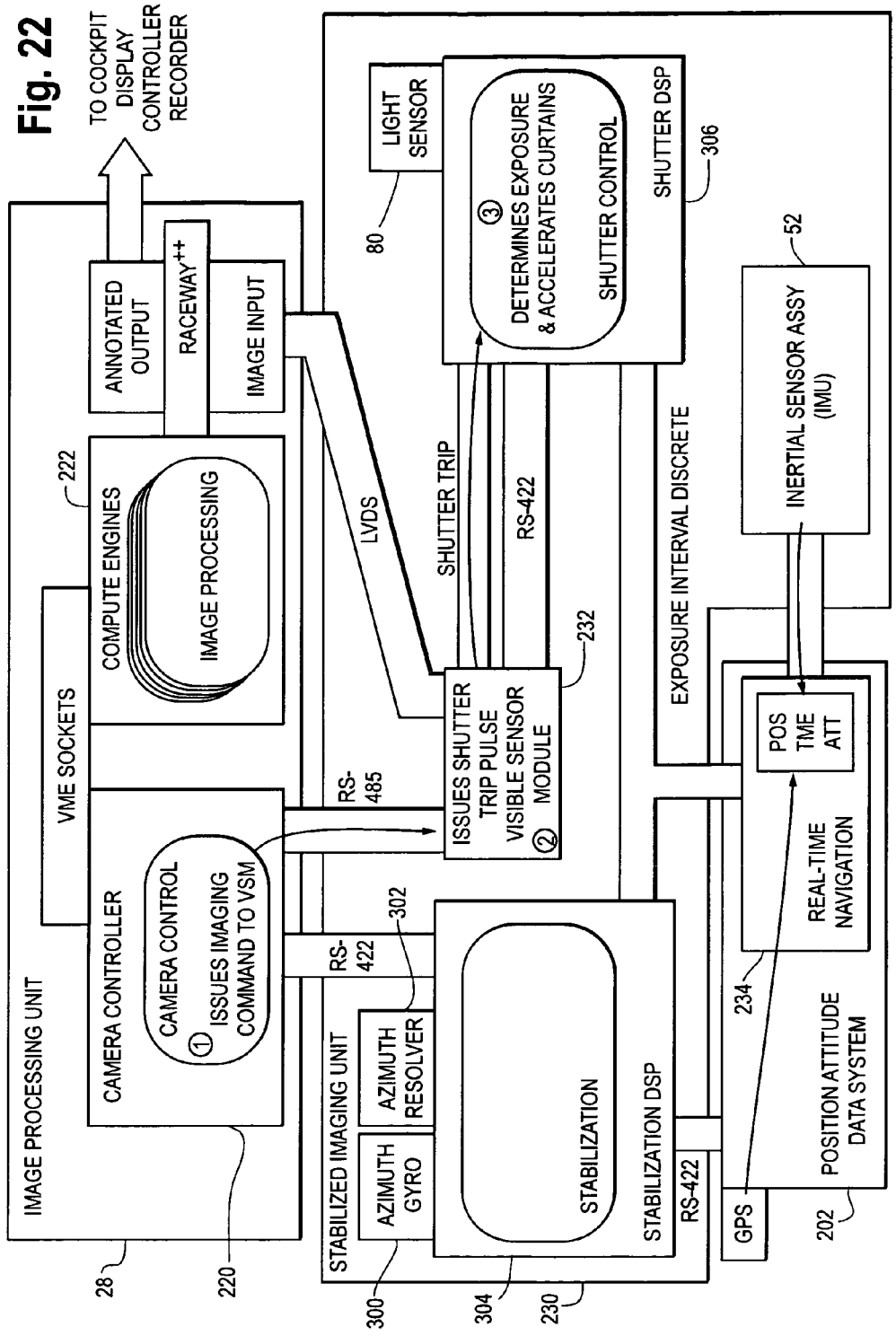
FIG. 22 is a more detailed block diagram of the image processing unit and the stabilized imaging unit of FIG. 21.

FIG. 22 is another illustration of the modules 202, 28 and 230 of FIG. 21. When an image is triggered for capture by the camera, the camera controller 220 issues an imaging command to the visible sensor module 232. The visible sensor module 232 issues a shutter trip pulse to a shutter digital signal processor 306. The shutter uses the light sensor 80 to determine the appropriate exposure time and then accelerates the shutter curtains to expose the focal plane array to incident radiation. The inertial measurement unit 52 provides position, time and attitude data during the exposure to the real time navigation module 234. GPS data from the aircraft navigation system is also provided to the module 234. Azimuth mirror position is obtained from an azimuth mirror resolver 302. A stabilization system DSP 304 also receives azimuth gyro signals from an azimuth gyro 300 that is mounted to the azimuth mirror 14 (FIG. 6). The focal plane array is exposed to the image and resulting pixel data is converted to digital form and provided to the image processing unit 28. The image processing unit includes software modules (compute engines 222) which operate on the captured images to calculate fiducial image centroids and distortion correction coefficients as explained herein.

The details on the implementation shown in FIGS. 21 and 22 are not particularly important to the inventive concepts disclosed herein and the description of FIGS. 21 and 22 is offered by way of illustration and not limitation. Furthermore, persons skilled in the reconnaissance camera art are familiar generally with the modules 202, 204, 206 and 208 (or their equivalents) and therefor a detailed description is omitted to avoid obfuscation of the inventive aspects of this disclosure.

Second Reconnaissance Camera Embodiment

A second embodiment of a reconnaissance camera includes the features and structures and modules of the first camera embodiment described above, except that an IMU unit rigidly coupled to the reference projector is not present. The camera includes the reference projector 18 and the image processing module to determine optical system characterization from fiducial images and perform distortion correction as explained herein. For example, the image processing module captures the images of the scene and the fiducial images, compares fiducial image locations to locations where such images would have been imaged had the camera optical system been distortion free and obtains distortion correction coefficients which map the actual fiducial image positions back to the positions in the idealized condition. Alternatively, such calculations are done in ray angle space instead of pixel location space. Such distortion correction coefficients can be applied to an entire image to thereby create a distortion corrected image. Alternatively, the distortion correction locations can be applied to a pixel or group of pixels representing a target and thus corrected pixel locations could be obtained for the target. In this regard, this second reconnaissance camera embodiment includes the same features and functionality as the first camera embodiment. However, since the second camera embodiment does not include the IMU rigidly coupled to the reference projector, it does not include the same geolocation feature that the first camera has. Furthermore, the second camera embodiment would not need to go through a boresight calibration process or determine a direction cosine transformation matrix to relate a reference projector coordinate system to an IMU coordinate system. The mechanical and optical details of the airborne camera are not particularly important and the principles are applicable to airborne or other types of cameras generally.

MBC Projector 18

The construction and operation of a presently preferred MBC projector 18 of FIG. 6 projecting collimated beams of light onto the imaging device will now be described further in conjunction with FIGS. 10-20.

Figure 10A:
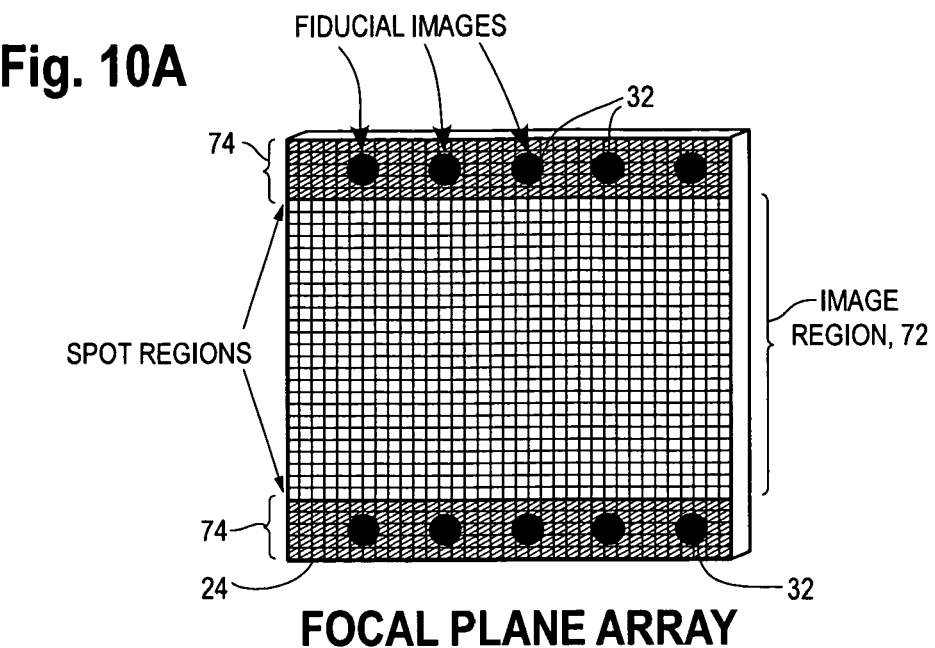
FIG. 10A is a schematic view of a focal plane array (image recording device) used in the reconnaissance camera of FIG. 6, showing the fiducial images from the MBC collimator (reference projector) imaged in the periphery of the array while scene information is primarily imaged in the center portion of the array.

FIG. 10A is a schematic view of a focal plane array 24 (image recording device) used in the reconnaissance camera 10 of FIG. 6, showing the fiducial images 32 from the MBC collimator 18 imaged in the periphery 74 of the array while scene information is primarily imaged in the center portion 72 of the array. As noted above, bandpass filtering that passes only the wavelength from the optical projector 18 is incorporated at the focal plane 24 (or just in front of the focal plane 24), in the areas 74 where fiducial images are expected.

Figure 10B:
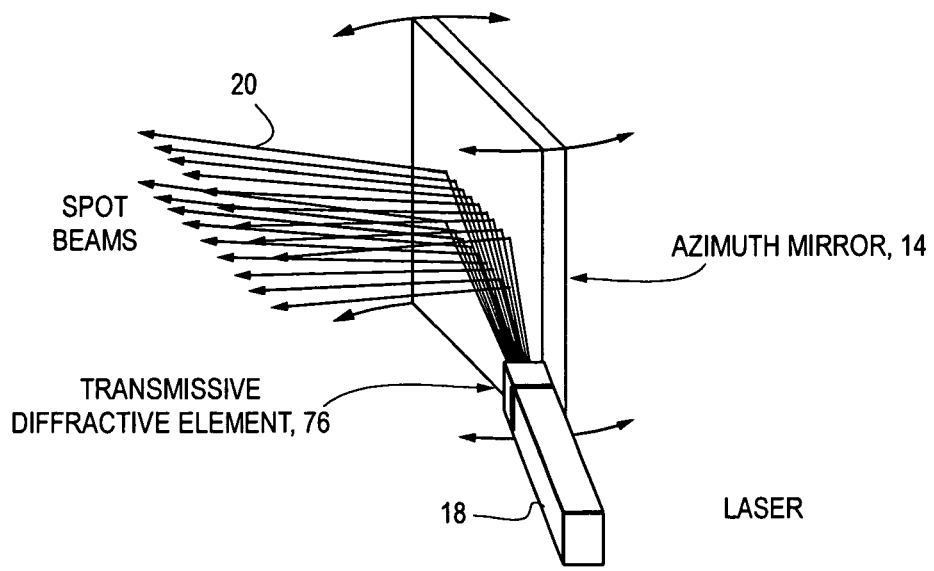
FIG. 10B is a schematic view of the MBC collimator, showing it projecting a set of spot beams in a fan arrangement. The beams are reflected off of an azimuth mirror into the optical path and imaged onto the focal plane array of FIG. 10A.

FIG. 10B is a schematic view of the MBC collimator 18, showing it projecting a set of spot beams 20 in a fan arrangement. The beams are reflected off of an azimuth mirror 14 into the optical path of the optical system and imaged onto the focal plane array (image recording device) 24 of FIG. 10A. Each beam 20 is imaged as separate fiducial image 32 (FIG. 10A). The collimator includes a transmissive refractive element 76 shown in greater detail in FIG. 11. In one presently preferred embodiment, the MBC uses purely refractive optics to project beams from multiple reticles formed from the ends of fibers. A less preferred embodiment would use a diffractive element to split a single beam into multiple beams, but the feasibility of using diffractive elements is limited by the capability of diffractive optics to produce a pattern without radiation at unwanted angles.

Figure 11:
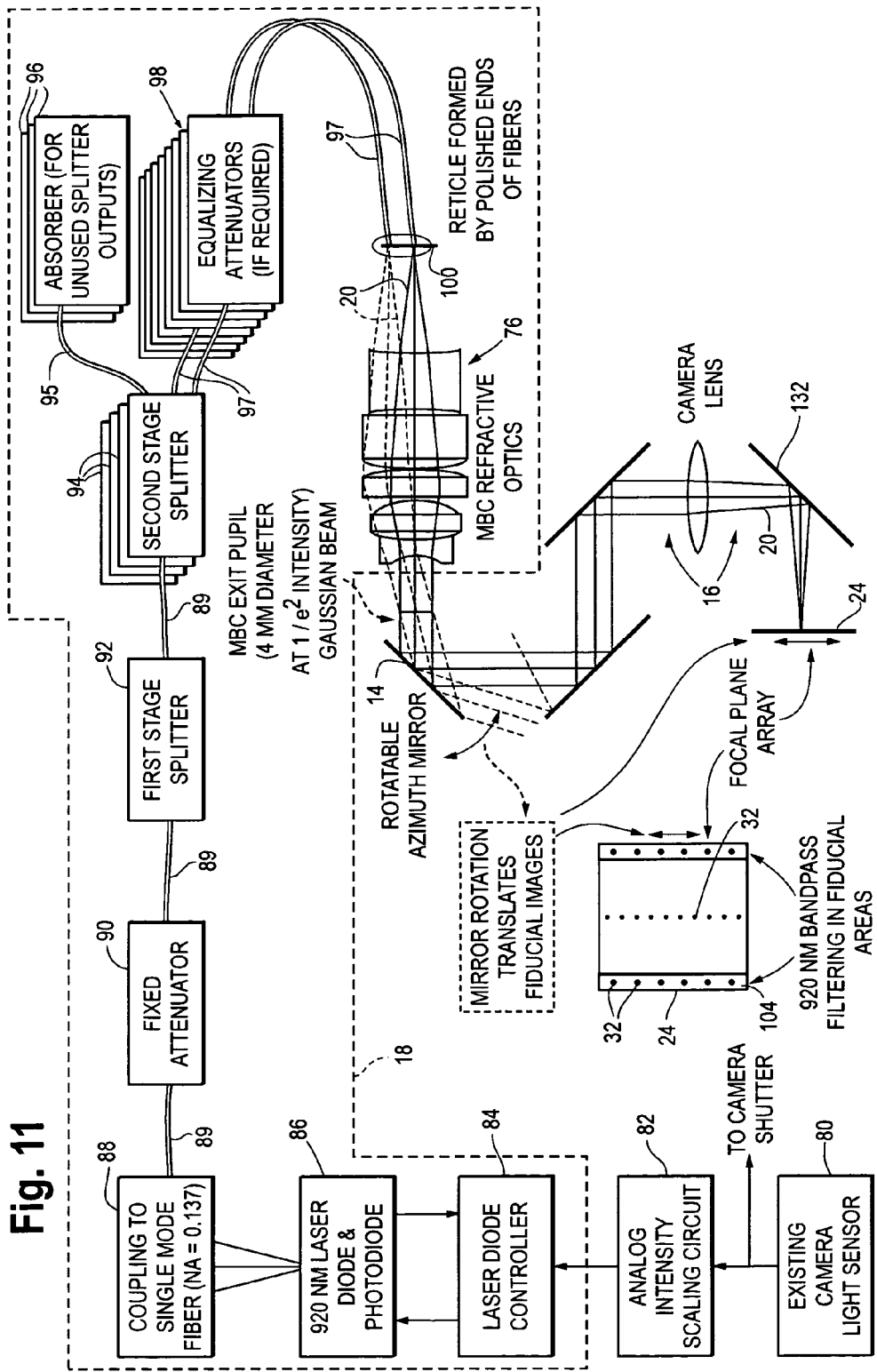
FIG. 11 is a block diagram showing the construction of the MBC collimator and its relationship to external circuitry and optical system components in the camera embodiment of FIG. 6.

FIG. 11 is a block diagram showing the construction of the MBC collimator 18 and its relationship to external circuitry and optical system components in the camera embodiment of FIG. 6. The camera includes a light sensor 80 which supplies an input signal to an analog intensity scaling circuit 82. The circuit 82 supplies an input signal to a laser diode controller 84 which turns on and off a 920 nm wavelength laser diode 86 which acts as a light source for the projector 18. The input signal to the laser diode controller is used by the controller 84 to adjust the illumination intensity or dwell time of the laser light source 86. The output of the laser source 86 is directed in free space to a coupling 88 which couples the light to a single mode fiber optic fiber. The light signal travels along the fiber 89 to a fixed attenuator 90, if required, and along fiber 89 to a first stage splitter 92. The light is further directed to a plurality of second stage splitters 94. A set of absorbers 96 absorb unused splitter outputs along fiber 95. The light signals to be used for the fan beams are directed along fibers 97 to equalizing attenuators (if required) and then to a reticle 100 formed by polishing the ends of the fibers. The light beams 20 in free space pass through the MBC refractive optics 76. The collimator 18 has a 4 mm diameter exit pupil at $1/e^2$ intensity. The beams have a Gaussian intensity distribution.

Figure 12:
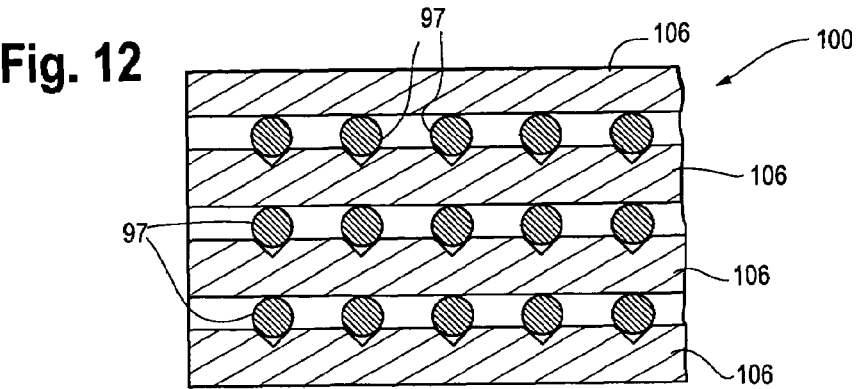
FIG. 12 is an end view of the reticle design of the MBC collimator of FIG. 10B and FIG. 11.

FIG. 12 shows the projector 18 reticle 100 in an end view. The single mode optical fibers 97 are sandwiched between fused silica blocks 106. The ends of the fibers 97 are polished.

Figure 13:
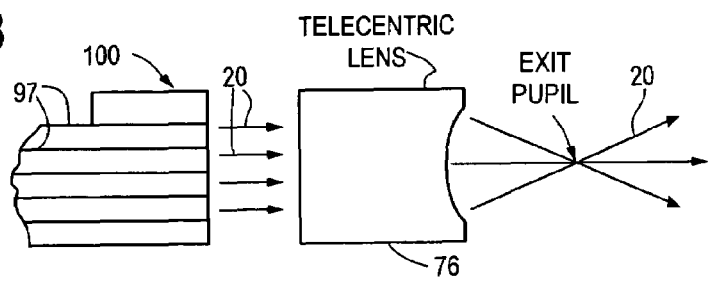
FIG. 13 is an illustration of the telecentric lens (MBC refractive optics) positioned in front of the reticle of FIG. 12 and showing the exit pupil of the MBC collimator.
Figure 14:
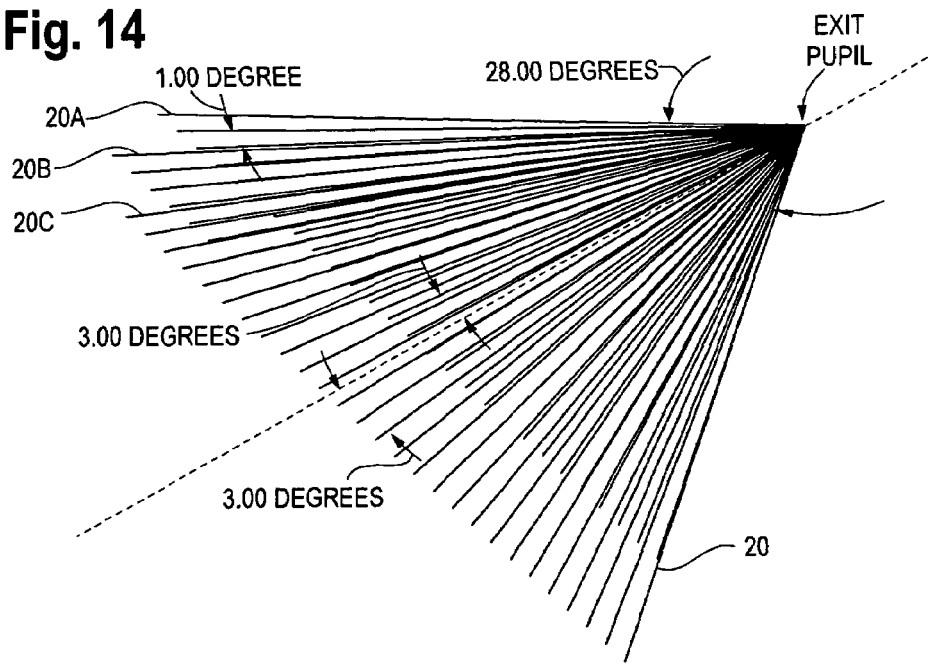
FIG. 14 is a perspective view showing the fan arrangement of the spot beams produced by the MBC collimator. The three fans of beams are separated from each other by a three degree angle, and within each fan of beams, the individual beams are separated from each other by one degree. Total spread of the fan beam is 26 degrees. Wide variation is possible in the design of the MBC collimator and the beam arrangement produced by the collimator.

FIG. 13 is an illustration of the telecentric lens 76 (MBC refractive optics) positioned in front of the reticle of FIG. 12 and showing the exit pupil of the MBC collimator. FIG. 14 is a perspective view showing the fan arrangement of the spot beams 20 produced by the MBC collimator. There are three fans of beams 20A, 20B, 20C, with beam 20A and 20C separated from the middle beam 20B by a three degree angle. Within each fan of beams, the individual beams 20 are separated from each other by a one degree angle. The total spread of the fan beams is 26 degrees. Wide variation is possible in the design of the MBC collimator 18 and the beam arrangement produced by the collimator, consequently the description of the collimator design in these figures is offered by way of illustration and not limitation.

Referring back to FIG. 11, the fan beams 20 are reflected off of the azimuth mirror 14 and other mirror elements and through the camera lens, off of a mirror 132 and onto the focal plane array 24. As shown in the lower left hand portion of the Figure, the fiducial images 32 are imaged at the peripheral areas of the array 24. The beams in the middle fan 20B (FIG. 14) are imaged in the center of the array 24 by virtue of the rotation action of the azimuth mirror 14 about its axis.

Figure 15:
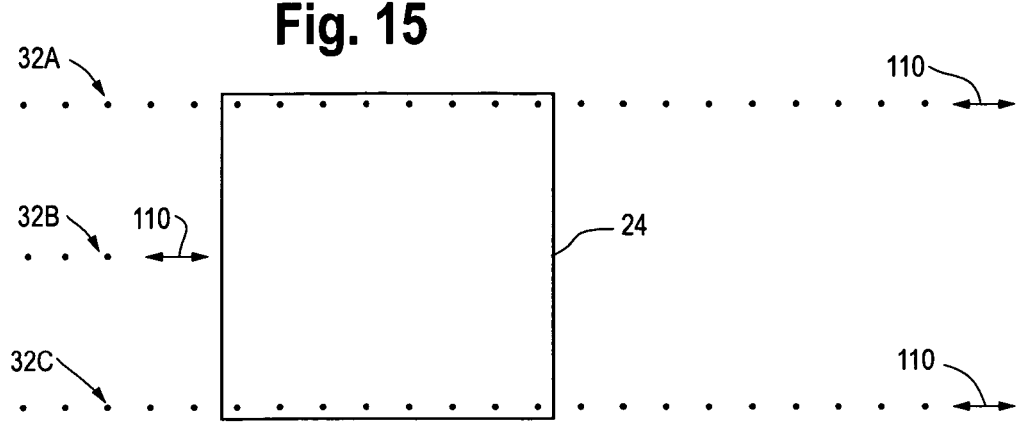
FIG. 15 is a schematic representation of where the fan of beams produced by the MBC collimator is projected onto the focal plane array and adjacent regions. The rotation of the azimuth mirror downstream in the optical path from the MBC collimator causes the arrangement shown in FIG. 15 to translate from left to right, which results in the beams in the middle fan beam being imaged roughly in the center of the focal plane array.
Figure 16:
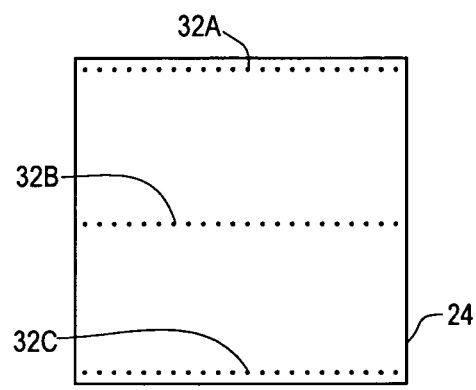
FIG. 16 shows the location of the three fan beams on the focal plane array.

FIG. 15 is a schematic representation of where the fan of beams (FIG. 14) produced by the MBC collimator 18 are projected onto the focal plane array and adjacent regions. The fiducial images 32B produced by the middle fan beam (20B, FIG. 14) are initially displaced to one side of the focal plane array 24. The rotation of the azimuth mirror 14 causes the arrangement of fiducial images 32A, 32B and 32C shown in FIG. 15 to translate from left to right, which results in the beams in the middle fan beam being imaged roughly in the center of the focal plane array. For example, at one end of the azimuth mirror rotation, the fiducial images 32A, 32B and 32C are imaged as shown in FIG. 16. At the other end of the azimuth mirror's rotational, the middle row 32B of fiducial images would not be imaged as it would be at one side, off of the array 24 as shown in FIG. 15.

Figure 17:
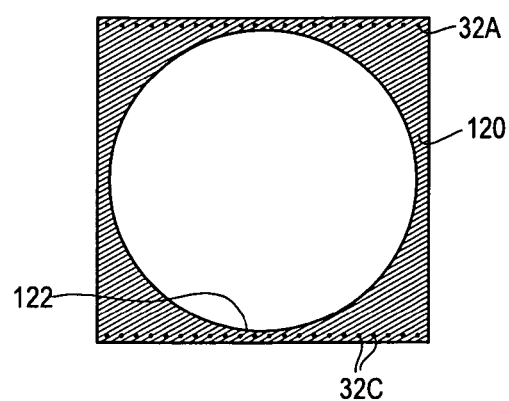
FIG. 17 shows the peripheral area of the array (shaded portion) for which distortion correction in the optical system would be available in the absence of the beams from the reference projector being imaged in the center of the array. The fact that the middle fan beams are imaged in the center of the array (at least from some values of azimuth mirror rotation) as shown in FIG. 16 permit a more complete characterization of the optical system performance, including portions closer to the center of the optical axis.

FIG. 17 shows the peripheral area of the array (shaded portion) for which distortion correction in the optical system can be determined from the fiducial images along the edges of the focal plane array. The portion of the image plane in the center of the array is not measured in this situation, hence the desirability of providing at least some fiducial images in the center of the array. The fact that the middle fan beams are imaged in the center of the array (at least from some values of azimuth mirror rotation) as shown in FIG. 16, permit a more complete characterization of the optical system performance, including portions closer to the center of the optical axis. The middle fan row (20B) only contains beams that are imaged for a limited range of azimuth mirror positions, so that images may be captured with or without these middle fiducial images.

Figure 18:
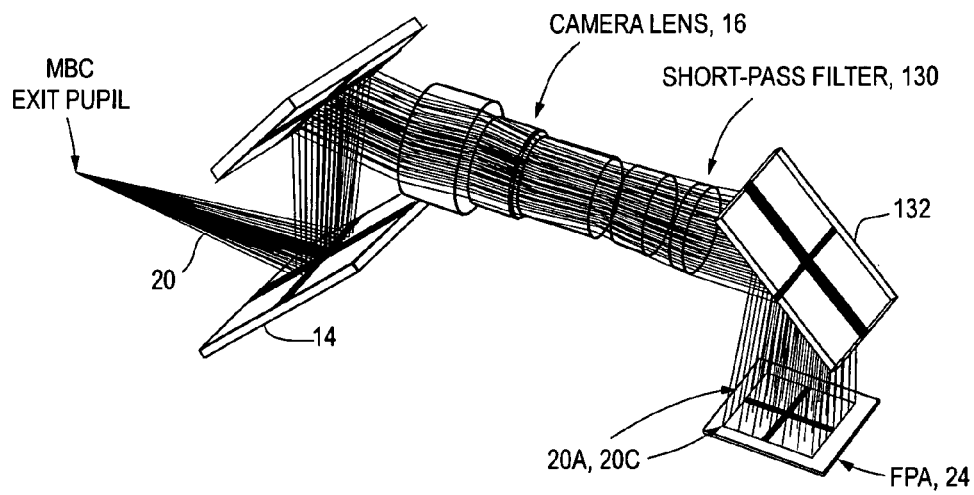
FIG. 18 is a perspective view of the optical path between the exit pupil of the MBC collimator and the focal plane array (image recording device).

FIG. 18 is a perspective view of the optical path between the exit pupil of the MBC collimator 18 and the focal plane array 24 (image recording device). The beams 20 are reflected off of the azimuth mirror 14 and through the camera lens 16, through a short pass filter 130 and off mirror 132 and onto the image recording device 24.

The MBC/fiducial image pattern as shown in FIG. 14 has several advantages. It provides for the full range of coverage for azimuth mirror 14 motion. The appropriate location of fiducial images, and the particular collimated beam associated with a particular fiducial image can be identified using the angle of the azimuth mirror (as approximately measured by a resolver), and the calibration data for the MBC/optical projector beam pattern.

Another advantage is that the fiducial images are grouped in a line at the top of the image, and another line at the bottom, as shown in FIG. 15. This leaves the center area of the focal plan array unobstructed for capturing scene/target imagery. The loss of area coverage due to the dedication of the upper and lower portions of the array for bandpass filtering/fiducial imaging can be compensated for by generating additional views of the scene. For example in a step-frame type reconnaissance camera, by a slight decrease in the cross-line of flight step size.

As shown in FIGS. 15 and 16, a partial third row of fiducial images 32B is provided with the azimuth mirror all the way over to one side, fiducial images are available over the full range of camera angles, from the center to edge to corner of the FPA. The current embodiment provides a third row of collimated beams, that will cover image radii from the optical axis to the edge of the focal plane. This allows measurement of the imaging system distortion at these smaller radii. This allows us to confirm that only the measurement at larger radii are needed to accurately characterize distortion over the full focal plane.

With reference to FIG. 17, interior radii distortion might be inferred from lab distortion data and distortion measurements from outer radii (fiducial images at the upper and lower edges). Outer radii should give more accurate data on high-order coefficients of geometrical distortion polynomial. Lower order coefficients in the geometrical distortion polynomial are obtained from fiducial images generated more in the middle of the array.

Generating light of sufficient intensity to create fully exposed fiducial images presents some challenges. Because the emitting spots in the reticle 100 needs to be very small, any attempt to create a reticle by masking a Lambertian source will fail, because there are no light sources at 920 nanometers of sufficient intensity. Also, such a reticle will need to be imaged with an optical system that requires a physical stop, which is a limitation for some optical system applications.

The design chosen for the MBC reticle (FIG. 12) uses a light radiated from the end of a single-mode optical fiber 97 to form a beam. The radiation pattern from the end of the optical fiber is Gaussian, and can be collimated to a parallel beam without a physical stop for controlling the diameter of the beams.

The radiation from the end of the fibers 97 is characterized by a numerical aperture. The MBC refractive optics 76 are designed to an f-ratio that matches this numerical aperture. The focal length of the refractive optics then defines the beam diameters and the ratio of angular beam spacing to the fiber reticle spacing.

The reticle 100 is constructed by laying individual fibers in grooved material (fused silica), and then adding another layer of fused silica, then fibers, etc. until three rows are built up, as shown in FIG. 12. The three rows of fiber are fully populated, so that the three rows are parallel and evenly spaced. Only the fibers that correspond to necessary beams 20 will be illuminated.

The fused silica was chosen because it had a lower coefficient of thermal expansion than crystalline silica. Fused silica is an "oddball" material for mounting optical fibers in this way. The telecommunications industry uses crystalline silicon, with v-grooves etched along crystal planes, to mount fibers in arrays for making multi-fiber connectors. An alternative to the illustrated embodiment would be to design the MBC refractive optics 76 to compensate for the thermal expansion coefficient of crystalline silicon, rather than fused silica. This would sharply reduce the cost of this reticle.

The reticle is illuminated by a 920 nanometer wavelength laser diode 86 (FIG. 11). The laser diode 86 is thermally regulated to stabilize its wavelength. This eases the requirement for chromatic aberration or "lateral color" for the MBC refractive optics 76.

The laser diode light source 86 for the MBC projector 18 is coupled to a single-mode optical fiber 89 (FIG. 11). The fiber is coupled to a set of two-way splitters 92 and 94 that divide the laser power among 64 individual fibers. The splitter is a six-level binary tree, where each node is a two-way fiber optic splitter. Each splitter is chosen for balanced splitting of energy, so that all 64 beams are matched in power output within 2 decibels.

To couple the splitters 92 and 94 (FIG. 11) to the reticle, corresponding fibers are spliced together, using standard single-mode fiber splicing techniques used in the telecom industry.

A power balance is required to allow each fiducial image to be fully exposed, without saturating the camera focal plane array detector for the brightest image. This is required for centroid calculation accuracy. Improvements in splitter technology that provide better power balance could improve centroid calculation accuracy. Power balance is achieved by equalizing attenuators 98 of FIG. 11.

Exposure control of the fiducial images can be done a couple of ways. One way is to control the intensity of the laser 86 via the same light sensor 80 that controls the shutter. This is difficult, as it requires considerable range of control (20:1) for laser output power. Another exposure control method is to pulse the laser for a brief interval, to control the amount of energy. These pulses need to be synchronized with the focal plane shutter, and need to be shorter than the minimum exposure time. Synchronization and pulse width are easily handled with an inexpensive microprocessor. This is a presently preferred method.

As mentioned earlier, the MBC contains refracting optics 76 (FIGS. 11, 13) that projects the reticle patterns as a set of beams. The f-ratio of the optics 76 matches the numerical aperture of the single-mode fiber used to construct the reticle. The focal length of these optics determines the diameter of each collimated beam, as well as the spacing between beams.

The MBC refracting optics 76 are based on telecentric imaging. This means that light from the reticle 100 enters the lens 76 parallel to the optical axis, and that the pupil is located in space beyond the MBC optics, as shown in FIG. 13.

Because the pattern emitted from the reticle 100 is Gaussian, no physical stop is required to control the beam diameter. Thus, a reflecting surface can be interposed between the telecentric lens and the pupil. This allows the MBC projector 18 pupil to be moved closer to the camera optical system entrance pupil while mounting the MBC in the camera aperture.

Because the collimated beams 20 diverge from the pupil of the MBC 28, if the beam misses the camera ray bundle that is at the same angle as the collimated beam, the collimated beam will fail to image, as it fails to enter the camera pupil.

This effect is most pronounced at the corners of the focal plane. The illustrated embodiment of the camera design has the azimuth mirror 14 placed at approximately the distance from the camera pupil where the corner ray bundles finally diverge. Thus, the telecentric design of the MBC projector 18 allows all the MBC beams to reflect off of the steerable azimuth mirror 14, and still be able to reach far into the corners of the FPA. Depending on the camera configuration, this may result in awkward mounting of the MBC projector 18, as it needs to be placed as close to the steerable azimuth mirror 14 as mechanically permits.

Other reconnaissance cameras could use a lower f-ratio lens (larger aperture) or a longer focal length to ease this problem. This could allow the MBC projector 18 to be mounted further from the camera pupil, in a more advantageous position, where its mounting stiffness can be increased. Off-center mounting could be done, minimizing obscuration of the camera aperture.

The MBC projector generates collimated beams 20 that are 4 millimeters in diameter. With respect to the camera focal length of 18 inches, the MBC beams are imaged at an f-ratio of approximately f-114. Thus, these beams will image as large Airy disks, approximately 150 microns in diameter. This is an approximately 15 pixel-diameter image. Accordingly, the centroid of the fiducial images can be calculated with great precision (with sub-pixel resolution).

Centroid Calculation

Figure 19A:
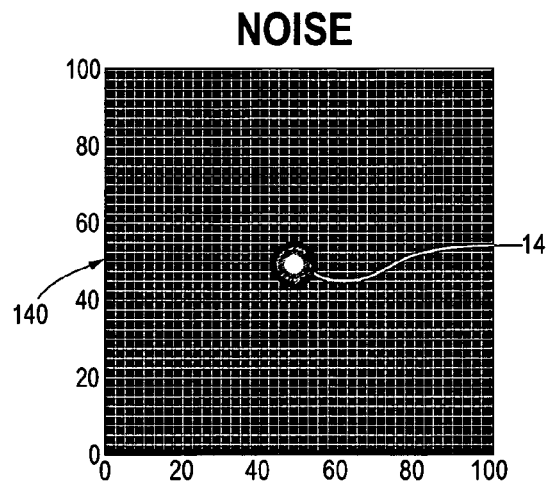
FIGS. 19A, 19B and 19C illustrate the effects of noise, scene clutter, and ghosts on the determination of the center of fiducial images produced by the MBC collimator.
Figure 19B:
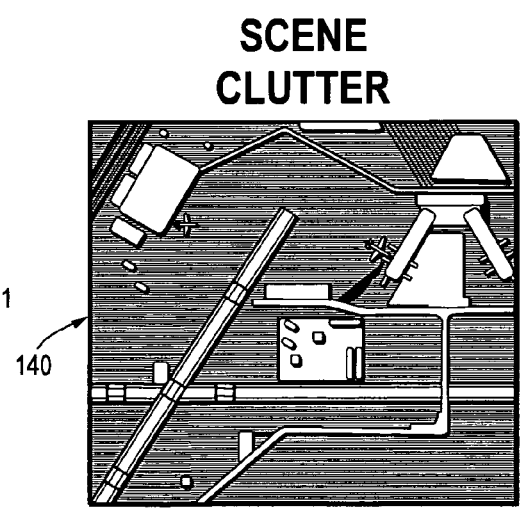
Figure 19C:
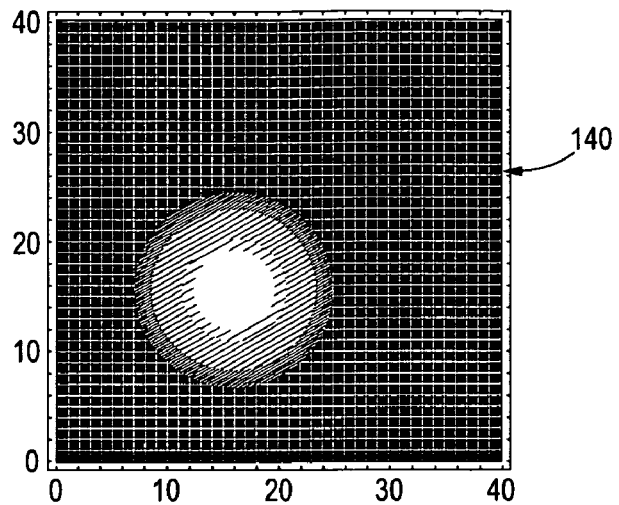

The process of characterizing optical system performance and obtaining distortion correction coefficients requires determining the precise location of the fiducial images 32 of FIGS. 3, 10A, 11, 16. As stated above, such fiducial images are obtained simultaneously (in the same exposure) as a scene image. FIGS. 19A, 19B and 19C illustrate the effects of noise, scene clutter, and ghosts, respectively on the determination of the center of fiducial images produced by the MBC collimator. Such noise, scene clutter and ghosts are present in an image 140 generated by the imaging device 24.

Two types of noise can affect the centroid calculation—background and signal noise. Non-zero background noise indicated by the spot 141 in FIG. 19A tends to pull the centroid calculation towards the center of the image. Signal noise produces random displacement of the centroid. Background noise is preferably reduced by the threshold processing done as part of the centroid location calculation. Signal noise is reduced by designing the imaging device to have a large signal to noise ratio.

Scene clutter (FIG. 19B) is unwanted scene content in the region where the centroid calculations will occur. Clutter that overlaps the fiducial image can displace the centroid. Scene clutter is reduced by using a narrow passband filter that rejects scene illumination other than at the wavelength of the projector 18 laser illumination source (e.g., 920 nm).

Ghosts (FIG. 19C) are spurious reflections from lens and filter interfaces. Such ghosts may be strong enough to cause a displacement of the centroid. The ghost effects tend to be on a scale several orders of magnitude greater in size as compared to the fiducial image spot size, and the ratio of ghost size (on the order of millimeters) to fiducial image spot size (on the order of microns) is sufficiently small that it is not an appreciable source of error, and in fact may be undetectable with a 8 bit quantization of pixel values.

Figure 20:
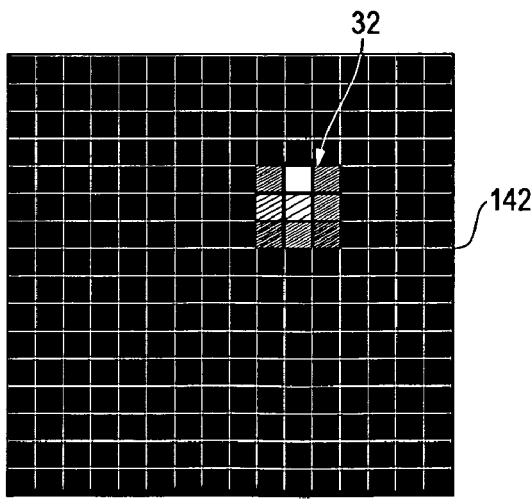
FIG. 20 is an illustration of a portion of the array and a single fiducial image produced by a single MBC collimated beam, and the algorithm for calculating the location of the center of the fiducial image ("centroid" herein).

FIG. 20 is an illustration of an image 142 from portion of the array and a single fiducial image 32 produced by a single MBC collimated beam. The image processing module or unit 28 (FIG. 1) includes an algorithm for calculating the location of the center (centroid) of each fiducial image. The calculation of the center is given by the expression shown in FIG. 20. The image processing unit 28 of FIG. 1 includes instructions encoding this expression and applying the expression to pixel values in regions where the fiducial images are located.

The calculation is performed for each fiducial image. A correlation between the fiducial images and the individual fan beams 20 from the projector 18 is possible since the rotational position of the mirror 14 is known at the time of the exposure, and the area where such fan beams are approximately going to be imaged by the array (i.e., the idealized position) is known in advance from the initial calibration of the optical system. The centroid position calculation of FIG. 20 is performed in each region where the fiducial images are expected to be imaged. The coordinates for the centroid locations are then stored for use in determination of the distortion correction coefficients, and specifically compared with the pixel coordinates of the areas where the corresponding fiducial images would be expected to be imaged in a distortion free optical system. From this comparison, transformation coefficients are obtained to map the actual pixel locations to the theoretical pixel locations.

The centroid calculation of the fiducial images, both in the initial calibration and in the generation of imagery, will ordinarily be with sub-pixel resolution both in the X and Y directions.

Figure 23:
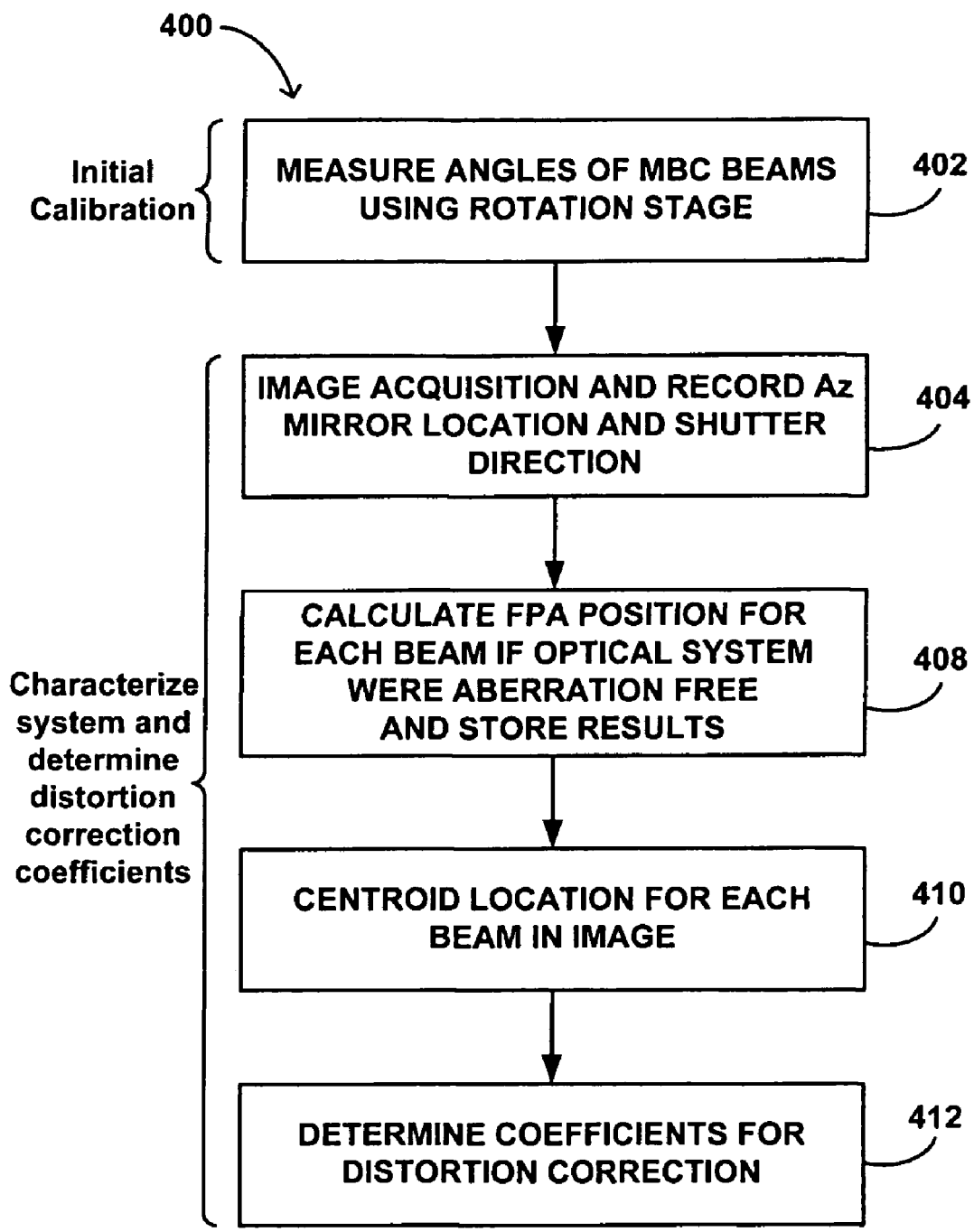
FIG. 23 is a flow chart showing a process for calibration of the reference projector and determination of distortion correction coefficients.

Initial calibration of the MBC projector 18, and subsequent obtaining distortion correction coefficients will now be discussed further with reference to FIG. 23. The process 400 is shown in flow chart form. At step 402, an initial calibration is performed in which a measurement of the angles of the MBC projector 18 beams is made using a rotation stage and a low aberration, long focal length camera. A common, stable mounting is provided for the index table, an autocollimating theodolite, and the imaging device, in a thermally stable environment. The MBC projector is mounted on the index table, tilted so that one set of collimated beams is parallel to the plane of rotation of the index table. By selecting one beam, and using the index table to move it through the camera image in 15 arc-minute intervals, the distortion in the center area of the FPA can be determined from image centroid calculations. For each beam in the set, an adjustment to the index table is made to place it at the setting that places it closest to the center of the FPA. The index table setting is used to measure its angle. This process is repeated for the other set of beams, and with the MBC rotated 90°, the across-width spacing can be measured for each pair.

At step 404, an image is acquired with the camera and the position of the azimuth mirror location and shutter direction is recorded. The azimuth mirror position can be recorded before and after the image is recorded in case of movement during the image capture. The image includes the fiducial images plus scene imagery.

At step 408, a calculation is made of the focal plane array position where each beam of the MBC projector would fall if the optical system were aberration and distortion free. This is done by assuming that the MBC projector 18 is rotated relative to the camera by twice the rotation of the azimuth mirror. This assumed rotation is carried out by subtracting this doubled rotation angle from the azimuth calibration angles for each of the MBC beams. The subset of MBC collimated beams that fall within the camera field of view can be selected. The imaging locations of these beams can be calculated by applying the relation $R=f\tan(\theta)$, and the determination and inversion of the beam rotation angle, $\phi$, relative to the camera axis.

Now, with such calculations performed and stored in memory, the camera is able to characterize the optical system performance and obtain distortion correction coefficients. At step 410, the centroid of each of the fiducial images is calculated using the procedure of FIG. 20. From the calculation in step 408, it is preferable to search for the fiducial images in approximately the same region as their theoretical position or to establish a boundary, say a square of 50 pixels by 50 pixels, where such fiducial images are expected to be located for a given value of azimuth mirror rotation. The centroid calculation then executes on each of the areas. The centroid locations are determined with subpixel resolution and the results stored in memory in the image processing unit.

At step 412, a determination is made of the coefficients for distortion correction. Step 412 is shown in greater detail in FIG. 24. At step 414, a least squares fit process is performed to find the transformation coefficients that map the measured centroid locations in step 410 back to the theoretical locations determined in step 408 of FIG. 23. This process will typically be performed initially for one of the possible distortion correction transformations of FIGS. 5A-5C, such as a translation transformation. Then, at step 416, a least squares fit process is performed for any other transformations, such as rotation transformation and inverse polynomial. At step 418, the fit quality of the least squares process is examined to determined whether the quality or closeness of the fit for the three transformations is acceptable. If not, the process loops back to step 414 and the results of the first pass are fed back into the least squares fit process and new transformation coefficients are obtained in steps 414 and 416. The process is iterative and repeats until a fit quality is good enough for the desired transformations. The coefficients for the transforms are then saved into memory. A further discussion of one specific embodiment of step 412 is set forth in the Appendix.

The transformation coefficients obtained in step 412 can be applied to the image as a whole or to any portion of the image.

The steps 404, 408, 410, and 412 can be performed for every image during operational use of the optical system to thereby derive distortion correction coefficients with every image. This feature enables dynamic variations in optical system distortion to be detected and compensated for. Step 402 of FIG. 23 is the only initial calibration step. Steps 404, 408, 410, 412 can be done at the time of scene imaging or later on when target designation or geolocation is performed. Accordingly, these steps do not need to be done necessarily in real time, and instead can be done at a later time. Hence, preferably when images are captured and stored, the images are stored along with a file of annotation data such as azimuth mirror resolver position, and fiducial image centroid locations, to allow such calculations to be done "off-line", e.g., by a ground station in an aerial reconnaissance embodiment, or any computer with access to the images and the annotation data and with appropriate software.

Figure 26:
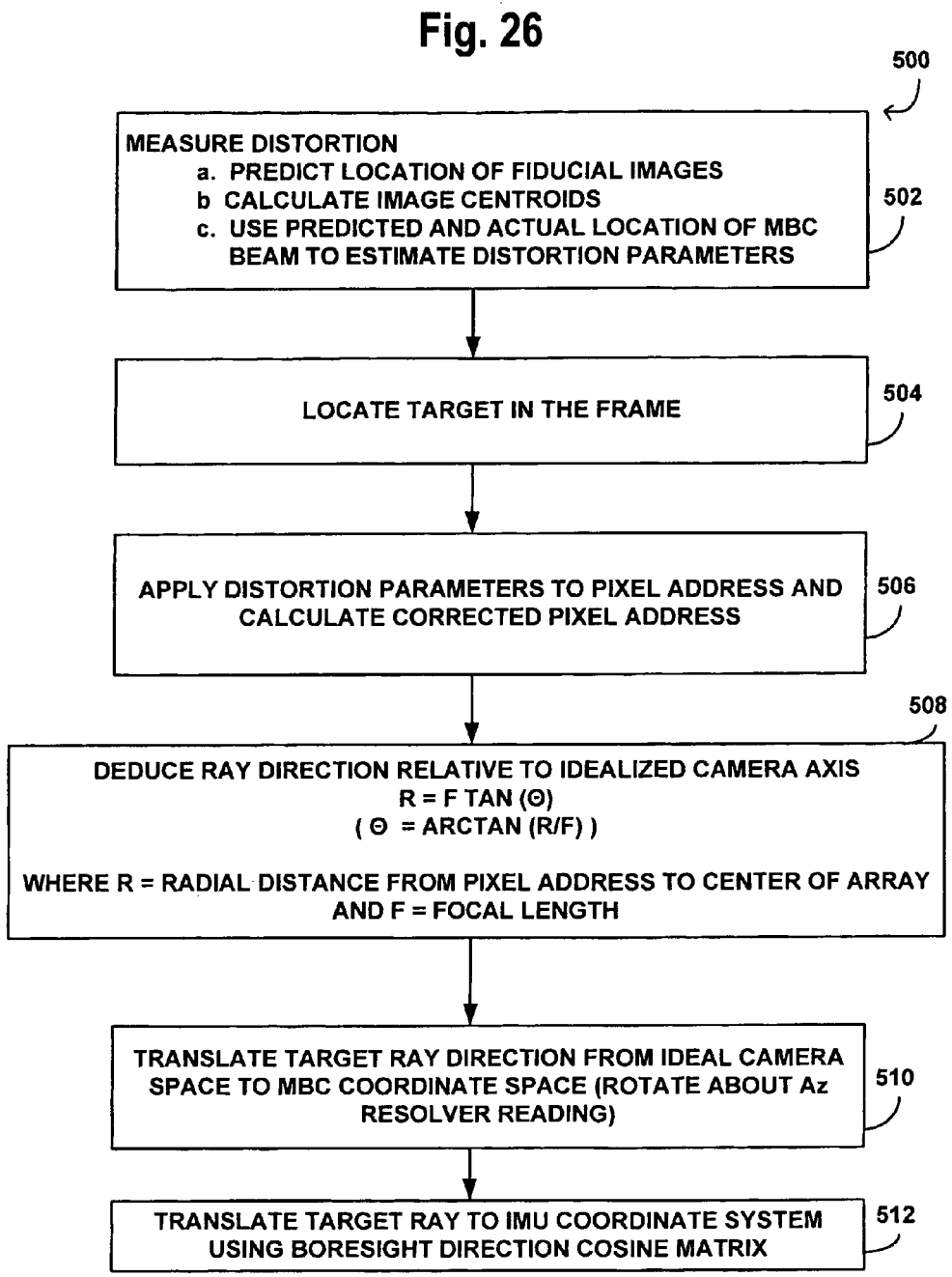
FIG. 26 shows a process for geolocation using the camera of FIGS. 6-18.

FIG. 26 is a flow chart showing a method 500 for geolocation from imagery using a reconnaissance camera with reference projector and inertial measurement unit as explained above in FIGS. 3 and 6-9.

At step 502, an image is generated and camera distortion is measured. This step includes the steps of predicting the location of the fiducial images, calculating the image centroids for fiducial images in the captured image, and using the predicted and actual locations of the beams to estimate or calculate the distortion correction coefficients. Step 502 basically consists of the looking up the calibration data obtained in steps 404 and 406 of FIG. 23, performing the centroid calculation of step 410 (and FIG. 20) and the coefficient determination step 412 of FIGS. 23 and 24.

At step 504, the target of interested is located in the image and its pixel address(es) extracted.

At step 506, the distortion correction parameters calculated in step 502 are applied to the pixel address and a new, distortion corrected pixel address is calculated using the distortion correction transformations (FIGS. 5A-5C). The scalar distance r from the new pixel address to the center of the focal plane array is determined.

At step 508, the ray angle relative to an idealized camera axis is determined using the relationship $\theta=\arctan(r/f)$.

At step 510, the target ray direction obtained in step 508 is translated into the MBC projector coordinate space by rotation of the angle determined in step 508 by the azimuth resolver reading.

At step 512, the target ray obtained in step 512 is translated to the inertial measurement unit coordinate space using the boresight direction cosine matrix explained previously in conjunction with FIGS. 25A and 25B.

Uses and Applications

The inventive concepts of this disclosure have a number of different uses in a variety of different types of optical systems.

1. Real Time Characterization of Optical System

A first use of the characterization and calibration methods described herein is in real-time characterization of the performance of the optical system. What this means is that, for every image generated by the optical system, information can be generated that quantifies the distortion, misalignment, aberration and other errors in the optical system. This information can be fed to an algorithm that processes pixel information representing the image to essentially un-distort or correct the image. The technique is generally applicable to all types of optical systems.

2. Geolocation from Imagery

A second use of the characterization methods is in improved geolocation of terrestrial objects from imagery captured by the optical system. This is described in detail above. While geolocation from imagery is not specifically new, the characterization features of this invention allow for more precise geolocation to be achieved, since the data characterizing of the performance of the system can be applied to the image to un-distort or correct the image and thereby provide pixel coordinates to a geolocation algorithm that more closely reflect that actual ray angle from the camera to the terrestrial object.

3. Passive Ranging

The use of the IMU and the optical projector 18 as described herein not only allows for improved geolocation to occur, but also for determination of the range from the reconnaissance camera to the target object. The range can be determined since the aircraft avionics system or the IMU will have its own position in space known at the time of the exposures, the location of the target object in three dimensions is obtained from the imagery, and therefore the distance to the target object can be calculated directly.

4. Passive Aiming for Weapon Sighting

The techniques described above could be used as a passive aiming system for a weapon. The weapon is coupled to a sighting or other precision optical system which includes the characterization features as described herein, such as MBC projector, IMU, electronic imaging array imaging fiducial images, and software for characterizing the performance of the optical system. Navigation inputs could be provided by vehicle position data (GPS data from a GPS unit), and orientation of the weapon could be provided via a tilt sensor. By identifying a target in two images, the position of the target relative to the vehicle, and the weapon aiming can be calculated based on the direction and distance to the target, and the characteristics of the weapon.

5. Remote Mapping

The techniques of this disclosure could be used for stereographic mapping, even with cameras that have considerable distortion or with time-varying distortion. This may permit accurate mapping with less expensive cameras, or under unfavorable conditions.

6. Navigation

Using the MBC projector 18 and IMU 52, known surveyed points could be imaged, and the position and orientation of the camera can be deduced with considerable accuracy using the techniques described above. This could be used as, or as an input to, a precision navigation system.

The techniques of this disclosure could be used to include optical window effects in these applications by locating the optical projector 18 beyond the window, so that the collimated beams 20 pass through the window. These optical effects are also measured.

Obviously, the techniques of this disclosure can be used with all imaging optical systems, both refractive, reflective, catadioptric, and various combinations thereof. Suitable imaging systems include cameras with only an imaging element, as well as cameras that include beam splitters, mirrors, and windows or optical filters. The techniques can be applied to multi-spectral cameras, where multiple projectors may be used. One imaging band camera may be used to measure mirror pointing, while projectors (not necessarily position/orientation references) measure distortion/magnification in each spectral imaging unit.

Other imaging systems useable with the present techniques include telescopes and microscopes. An optical comparator could be built, with less-expensive, higher distortion lenses, and still measure objects with high accuracy.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A system comprising:
    an optical system directing light from a scene onto a focal plane;
    a projector projecting a set of collimated beams of light, the optical system directing the set of collimated beams onto the focal plane;
    an image recording device located at the focal plane capturing an image of both the collimated beams and the scene during operation of the system; and
    a processing module including software for applying a distortion correction to at least a portion of the image, the distortion correction derived from the image of the collimated beams.

2. The system of claim 1, wherein the software applying a distortion correction comprises at least one of a 1) a module performing an inverse polynomial transformation correction modeling magnification and distortion errors of the optical system, 2) a module performing a rotation transformation correction, and 3) a module performing a linear transformation correction.

3. The system of claim 2, wherein the software comprises modules 1), 2) and 3).

4. The system of claim 1, wherein the projector projects an array of individual collimated light beams, wherein the projector is designed to project the collimated light beams onto the periphery of the image recording device.

5. The system of claim 1, wherein the projector includes a laser light source.

6. The system of claim 1, wherein the laser light source projects light at a wavelength which is selected such that it is outside of the band where useful scene information is normally imaged by the image recording device.

7. The system of claim 1, wherein the image recording device comprises an electronic imaging device constructed as pixels arranged in rows and columns, and wherein the processing module further comprises a routine for determining the pixel address of the centers of the beams projected by the projector.

8. The system of claim 1, wherein the system is selected from the group of optical systems consisting of a camera, a microscope, a telescope, and an imaging system for targeting a weapon.

9. The system of claim 1, wherein the system comprises a camera, and wherein the camera further comprises an inertial measurement unit and wherein the inertial measurement unit and the projector are mounted within the camera in a fixed position relative to each other.

10. The system of claim 1, wherein the projector is configured to project an array of beams in a fan-shaped arrangement wherein a set of beams are imaged on the image recording device across the width of the image recording device.

11. The system of claim 1, wherein the projector comprises a single mode fiber optic reticle constructed and arranged to produce a Gaussian radiation pattern of collimated beams, without the use of a physical stop for controlling the diameter of the collimated beams.

12. The method of claim 11, wherein the optical system is selected from the group of optical systems consisting of a camera, a microscope, a telescope, and an imaging system for targeting a weapon.

13. The method of claim 11, wherein the projector is configured to project an array of beams in a fan-shaped arrangement wherein a set of beams are imaged on the image recording device across the width of the image recording device.

14. A method of compensating for distortion errors in an optical system, comprising the steps of:
   a) determining the location of where collimated beams from a projector would be imaged by an image recording device incorporated into the optical system if the optical system were distortion free;
   b) obtaining an image of a scene along with an image of the collimated beams projected onto the image recording device by the projector and determining the location of the collimated beams in the image;
   c) determining transformation coefficients that map the locations of the image of the collimated beams determined in step b) to the locations determined in step a); and
   d) applying the transformation coefficients to at least a portion of the image of the scene in step b) such that the optical system distortions are corrected.

15. The method of claim 14, wherein the corrected distortions are translated to incoming ray angles.

16. The method of claim 15, wherein the incoming ray angles are supplied to a processing module applying a geolocation algorithm for determining the location of the object on the surface of the earth.

17. The method of claim 14, wherein the method is performed in an aerial camera and wherein the transformation coefficients are applied to pixel coordinates for pixels imaging an object of interest in a scene to thereby obtain corrected pixel coordinates for the object.

18. The method of claim 14, wherein the projector is rigidly coupled to an inertial measurement unit, and wherein the projector and inertial measurement unit are mounted within a camera.

19. The method of claim 18, further comprising the step of passively determining the range to an object in the scene corresponding to the portion of the image.

20. The method of claim 18, further comprising the step of deducing the location of the aerial camera from the image.

21. The method of claim 14, wherein step d) comprises at least one of a 1) an inverse polynomial transformation correction modeling magnification and distortion errors of the optical system, 2) a rotation transformation correction, and 3) a linear transformation correction.

22. The method of claim 21, wherein step d) performs corrections 1), 2) and 3).

23. The method of claim 14, wherein the projector comprises a source of an array of individual collimated light beams, wherein the projector is designed to project the collimated light beams onto at least the periphery of the image recording device.

24. The method of claim 14, wherein the projector includes a laser light source.

25. The method of claim 24, wherein the laser light source projects light at a wavelength which is selected such that it is outside of the band where useful scene information is normally imaged by the image recording device.

26. The method of claim 14, wherein the image recording device comprises an electronic imaging device constructed as pixels arranged in rows and columns, and wherein the method further comprises a centroid calculation routine for determining the pixel address of the centers of the beams projected by the projector during step b).

27. A method for compensating for distortion errors in a precision optical system, comprising the steps of:
   a) obtaining an image of a scene along with an image of collimated beams of light projected onto an image recording device by a projector;
   b) determining the locations on the image recording device of the collimated beams in the image and the associated true ray angles for the collimated beams;
   c) determining the apparent incoming ray angles $\theta$ of the collimated beams from the locations on the image recording device using the relation $\theta=\arctan(r/f)$, where r is a scalar distance from the beams to the center of the image recording device and f is the focal length of the optical system;
   d) determining transformation coefficients that map the true incoming ray angles determined in step b) to the apparent incoming ray angles determined in step c);
   e) applying the transformation coefficients determined in step d) to at least a portion of the image to thereby correct optical system distortions.

28. The method of claim 27, wherein the projector comprises a single mode fiber optic reticle constructed and arranged to produce a Gaussian radiation pattern of collimated beams, without the use of a physical stop for controlling the diameter of the collimated beams.

29. The method of claim 27, wherein the precision optical system is selected from the group of optical systems consisting of a camera, a microscope, a telescope, and an imaging system for targeting a precision guided munition.

30. The method of claim 29, wherein the camera comprises an aerial camera.

31. The method of claim 30, wherein the aerial camera includes an inertial measurement unit rigidly coupled to the projector.

32. The method of claim 31, further comprising the step of passively determining the range to an object in the scene corresponding to the portion of the image.

33. The method of claim 31, further comprising the step of deducing the location of the aerial camera from the image.

* * * * *